United States Patent
Yabuki et al.

(10) Patent No.: US 12,498,977 B2
(45) Date of Patent: Dec. 16, 2025

(54) COMPUTER-READABLE RECORDING MEDIUM STORING INFORMATION PROCESSING PROGRAM, INFORMATION PROCESSING METHOD, AND INFORMATION PROCESSING SYSTEM

(71) Applicant: Fujitsu Limited, Kawasaki (JP)

(72) Inventors: Ryosuke Yabuki, Kobe (JP); Yoshihiro Kimura, Kobe (JP)

(73) Assignee: Fujitsu Limited, Kawasaki (JP)

( * ) Notice: Subject to any disclaimer, the term of this patent is extended or adjusted under 35 U.S.C. 154(b) by 496 days.

(21) Appl. No.: 17/984,283

(22) Filed: Nov. 10, 2022

(65) Prior Publication Data
US 2023/0273827 A1  Aug. 31, 2023

(30) Foreign Application Priority Data

Feb. 25, 2022  (JP) .................................. 2022-028656

(51) Int. Cl.
*G06F 9/50* (2006.01)
*G06F 9/455* (2018.01)

(52) U.S. Cl.
CPC ............ *G06F 9/5022* (2013.01); *G06F 9/455* (2013.01); *G06F 9/45558* (2013.01); *G06F 9/5038* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

2014/0019613 A1* 1/2014 Ishikawa ............. H04L 67/1004
                                                            709/224
2015/0113320 A1* 4/2015 Honma ................ G06F 11/2023
                                                            714/13

FOREIGN PATENT DOCUMENTS

| JP | 8-286856 A     | 11/1996 |
|----|----------------|---------|
| JP | 2011-100263 A  | 5/2011  |
| JP | 2015-060279 A  | 3/2015  |
| JP | 2017-068480 A  | 4/2017  |
| JP | 2020-518073 A  | 6/2020  |

(Continued)

OTHER PUBLICATIONS

Japanese Office Action mailed Sep. 16, 2025 for corresponding Japanese Patent Application No. 2022-028656 with English Translation, 13 pages. * Please note JP-2017-68480-A was previously filed on Nov. 10, 2022 .*.

*Primary Examiner* — Qing Yuan Wu
(74) *Attorney, Agent, or Firm* — Fujitsu Intellectual Property Center

(57) ABSTRACT

A non-transitory computer-readable recording medium stores an information processing program for causing a computer to execute processing includes: acquiring a first condition of an execution environment to which a first job is deployed with reference to first information that makes it possible to specify, for each job, a condition of an execution environment to which the job is deployed; creating a first execution environment to which the first job is deployed based on the acquired first condition; deploying the first job to the created first execution environment; executing the first job; and deleting, in response to completion of the first job, the created first execution environment to which the first job is deployed in a case where a deletion condition that corresponds to the first job is satisfied.

14 Claims, 20 Drawing Sheets

(56) References Cited

FOREIGN PATENT DOCUMENTS

| JP | 2020-107987 A | 7/2020 |
| JP | 2021-166006 A | 10/2021 |
| WO | 2018/197928 A1 | 11/2018 |

\* cited by examiner

FIG. 4

| JOB NET NAME | JOB NUMBER | PRECEDING JOB | EXECUTION INSTANCE DEFINITION | JOB EXCLUSION FLAG | ACTIVATION CONDITION | ACTIVATION DATE |
|---|---|---|---|---|---|---|
| JOB NET A | 1 | | Instanse_1 | JobFlag_1 | INTERVAL ACTIVATION | OCTOBER 1 |
| JOB NET B | 1 | | Instanse_1 | JobFlag_1 | TIME ACTIVATION | OCTOBER 1 |
| | 2 | 1 | Instanse_1 | JobFlag_1 | | OCTOBER 1 |
| JOB NET C | 1 | | Instanse_1 | JobFlag_2 | TIME ACTIVATION | OCTOBER 1 |
| | 2 | 1 | Instanse_1 | JobFlag_2 | | OCTOBER 1 |
| | 3 | 2 | Instanse_1 | JobFlag_2 | | OCTOBER 1 |
| JOB NET D | 1 | | Instanse_2 | JobFlag_1 | INTERVAL ACTIVATION | OCTOBER 1 |
| JOB NET A | 1 | | Instanse_1 | JobFlag_1 | INTERVAL ACTIVATION | OCTOBER 2 |
| ..... | | | | | | |

FIG. 5

| EXECUTION SERVER CONTAINER NAME | EXECUTION INSTANCE DEFINITION | JOB EXCLUSION FLAG | CREATION DATE AND TIME |
|---|---|---|---|
| CONTAINER A | Instanse_1 | JobFlag_1 | OCTOBER 1 |
| CONTAINER B | Instanse_1 | JobFlag_2 | OCTOBER 1 |
| CONTAINER C | Instanse_2 | JobFlag_1 | OCTOBER 1 |
| ⋮ | | | |

FIG. 6

| EXECUTION INSTANCE NAME | EXECUTION SERVER CONTAINER IMAGE | DEPLOYMENT REQUEST INFORMATION | | DEPLOYMENT OPTION | | |
|---|---|---|---|---|---|---|
| | | AUTHENTICATION INFORMATION | CONNECTION DESTINATION URL | THE NUMBER OF CPUs | MEM | ENVIRONMENT VARIABLE |
| Instanse_1 | rhel8_image | AuthInfo_1 | http://hoge1.com | 1 | 4GB | Env1=value1<br>Env2=value2 |
| Instanse_2 | centos7_image | AuthInfo_2 | http://hoge2.com | 1 | 2GB | Env1=value1<br>Env2=value2 |
| ... | | | | | | |

600
600-1

COMPUTER-READABLE RECORDING MEDIUM STORING INFORMATION PROCESSING PROGRAM, INFORMATION PROCESSING METHOD, AND INFORMATION PROCESSING SYSTEM

CROSS-REFERENCE TO RELATED APPLICATION

This application is based upon and claims the benefit of priority of the prior Japanese Patent Application No. 2022-28656, filed on Feb. 25, 2022, the entire contents of which are incorporated herein by reference.

FIELD

The embodiment discussed herein is related to an information processing program, an information processing method, and an information processing system.

BACKGROUND

Since before, there is a system formed by a manager that manages jobs and an execution server that executes jobs, which exist on a cloud. For example, the execution server is introduced and operated on the cloud by a user.

Japanese Laid-open Patent Publication No. 2017-068480, Japanese National Publication of International Patent Application No. 2020-518073, Japanese Laid-open Patent Publication No. 2015-060279, and Japanese Laid-open Patent Publication No. 2011-100263 are disclosed as related art.

SUMMARY

According to an aspect of the embodiments, a non-transitory computer-readable recording medium stores an information processing program for causing a computer to execute processing includes: acquiring a first condition of an execution environment to which a first job is deployed with reference to first information that makes it possible to specify, for each job, a condition of an execution environment to which the job is deployed; creating a first execution environment to which the first job is deployed based on the acquired first condition; deploying the first job to the created first execution environment; executing the first job; and deleting, in response to completion of the first job, the created first execution environment to which the first job is deployed in a case where a deletion condition that corresponds to the first job is satisfied.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram illustrating an example of content stored in a job net management table 400;

FIG. 5 is an explanatory diagram illustrating an example of content stored in a container management table 500;

FIG. 6 is an explanatory diagram illustrating an example of content stored in an instance definition management table 600;

DESCRIPTION OF EMBODIMENTS

For example, for example, there is a technology in which an execution environment matching input execution requirements is created in a cloud system, and execution processing is executed in the created execution environment. Furthermore, for example, there is a technology in which a plurality of transaction definition vectors corresponding to a plurality of transactions performable by a monolithic legacy application is created. Furthermore, for example, there is a technology in which, in a case where an execution request of a job is received, the number of servers to execute the job is determined based on an execution condition of the job and a load situation. Furthermore, for example, there is a technology in which a virtual computer that executes each job is changed in response to receiving a notification of configuration change of the virtual computer.

However, in the prior arts, there is a problem that an increase in a workload imposed on a user who operates an execution server is incurred. For example, the user manually prepares the execution server satisfying requirements of a job on a cloud, as appropriate. For example, the user manually deletes the execution server prepared on the cloud, as appropriate. Furthermore, a method of automatically activating a virtual machine that implements the execution server satisfying the requirements of the job and deploying the job to the virtual machine is conceivable. However, there is a problem that timing of starting execution of the job is delayed and a use amount of resources increases. Thus, it is needed to manually control activation and deletion of the virtual machine, which may incur an increase in the workload imposed on the user.

In one aspect, an embodiment aims to achieve reduction in a workload.

Hereinafter, an embodiment of an information processing program, an information processing method, and an information processing system will be described in detail with reference to the drawings.

(Example of Information Processing Method According to Embodiment)

Figure 1:
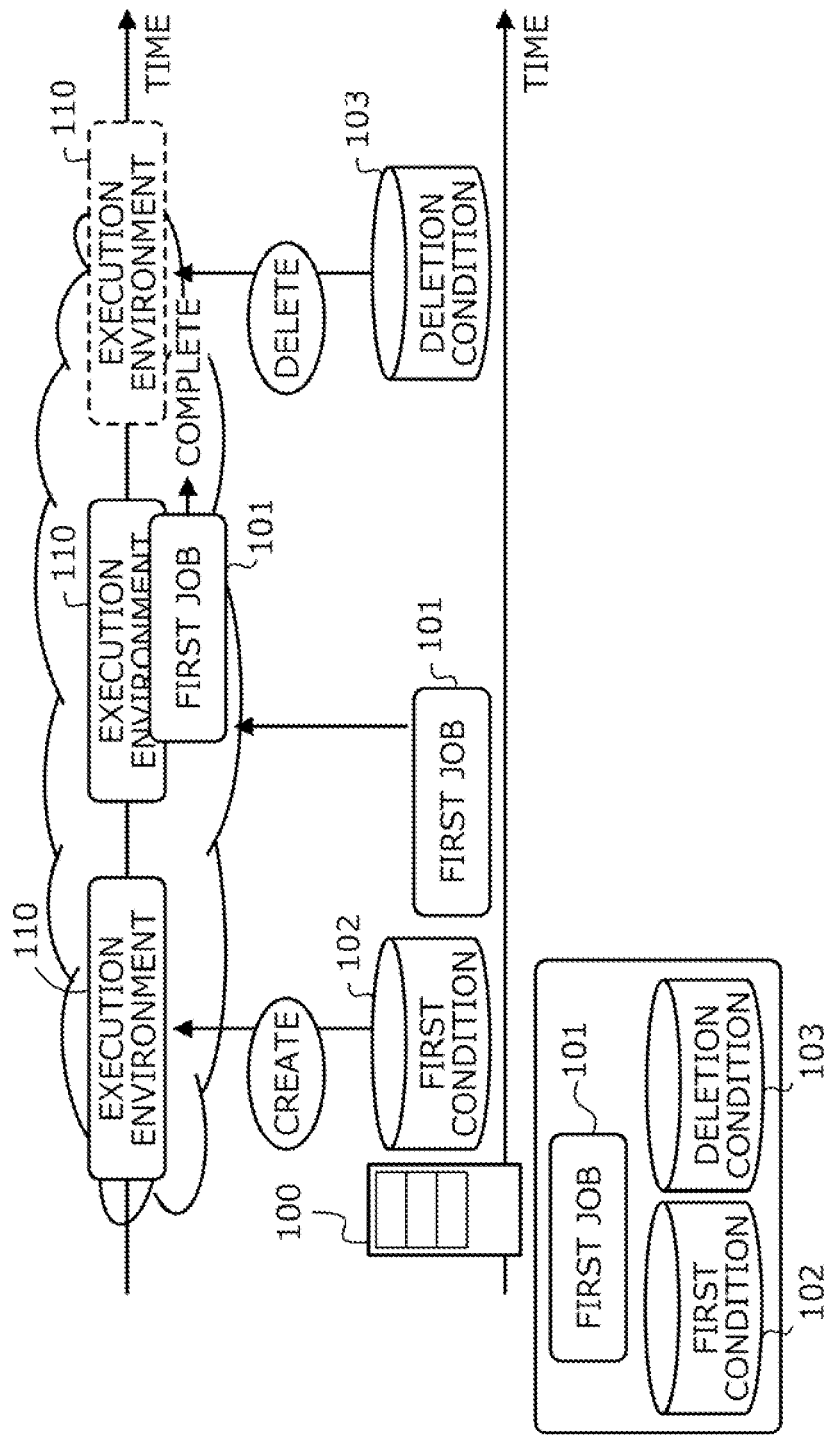
FIG. 1 is an explanatory diagram illustrating an example of an information processing method according to an embodiment.

FIG. 1 is an explanatory diagram illustrating an example of the information processing method according to the embodiment. An information processing device 100 is a computer that manages an execution environment to which a job is deployed. The execution environment is implemented on a cloud, for example. The execution environment is, for example, a container.

Since before, it may be desired to build a system on the cloud. For example, it may be desired to transfer an existing system to the cloud without changing rules for operating jobs. For example, it is conceivable to form a system for operating jobs by a manager that manages the jobs and an execution server that executes the jobs, which exist on the cloud. For example, the execution server is introduced and operated on the cloud by a user. For example, a service is conceivable in which the manager that manages the jobs is prepared on the cloud and provided to the user. However, the execution server on which the jobs are arranged is prepared by the user.

However, since before, there is a problem that an increase in a workload imposed on the user who operates the execution server is incurred. For example, the user manually prepares the execution server satisfying requirements of a job on a cloud, as appropriate. For example, the user manually deletes the execution server prepared on the cloud, as appropriate. Thus, the execution server that may be deleted remains on the cloud. Therefore, there is a problem that it becomes difficult to suppress an increase in a use amount of resources. The resources may be, for example, computational resources, time resources, human resources, financial resources, or the like.

Furthermore, for example, a method is conceivable in which a virtual machine that implements the execution server is automatically activated for each job, and the job is deployed to the virtual machine that implements the execution server. In this method, there is a problem that timing of starting execution of the job tends to be delayed, and it becomes difficult to suppress the increase in the use amount of the resources.

For example, a time needed to activate the virtual machine tends to be relatively long. Thus, when it is assumed that the virtual machine is automatically activated immediately before the start of the execution of the job, the timing of starting the execution of the job tends to be delayed. For example, when it is assumed that the virtual machine is automatically activated a certain time or more before the start of the execution of the job prior to the start of the execution of the job, it becomes difficult to suppress the increase in the use amount of the resources. For example, since the virtual machine is activated for each job, in order to sequentially execute a plurality of jobs, a plurality of the virtual machines to each of which a different job is deployed will be sequentially activated, and there is a problem that timing of starting execution of a subsequent job tends to be delayed.

Furthermore, in this method, there is a problem that, in a case where it is desired to exchange data between two jobs, it is difficult to link and exchange data between virtual machines to which the respective jobs are deployed. For example, it may be difficult to activate and delete the virtual machines automatically and appropriately in consideration of a relationship between the jobs that exchange the data, and the data exchange may fail. Furthermore, an unnecessary virtual machine may continue to be activated. Therefore, there is a problem that it becomes difficult to suppress the increase in the use amount of the resources.

On the other hand, a method of using a container instead of the virtual machine is also conceivable. However, there is a problem that it is difficult to create and delete the container automatically and appropriately in consideration of the relationship between the jobs that exchange the data. Therefore, it may be desired to manually control creation and deletion of the container, and there is a problem that an increase in a workload imposed on a user is incurred.

Thus, in the present embodiment, an information processing method capable of achieving reduction in a workload imposed on an operator who manages an execution environment will be described.

In FIG. 1, the information processing device 100 stores first information. The first information is information indicating, for each job, a condition of an execution environment to which the job is deployed in a specifiable manner. The condition indicates, for example, performance of the execution environment. The performance is defined by, for example, the number of central processing units (CPUs), a size of a storage area, or the like. The performance may be defined by, for example, an environment variable or the like. The execution environment is, for example, a container. The first information is, for example, information indicating, in association with a first job 101, a first condition 102 of an execution environment to which the first job 101 is deployed in a specifiable manner.

The information processing device 100 associates and stores, for each job, a deletion condition for deleting the execution environment to which the job is deployed. The deletion condition indicates that, for example, the job has been completed. The deletion condition may indicate, for example, a situation of the execution environment to which the completed job is deployed, or the like. The situation may be, for example, presence or absence of existence of another job scheduled to be executed later. The information processing device 100 indicates, for example, a deletion condition 103 for deleting the execution environment to which the first job 101 is deployed in a specifiable manner.

(1-1) With reference to the first information, the information processing device 100 acquires the first condition 102 of the execution environment to which the first job 101 is deployed. The information processing device 100 creates a first execution environment 110 to which the first job 101 is deployed based on the acquired first condition 102. For example, the information processing device 100 creates the first execution environment 110 to which the first job 101 is deployed in another computer on the cloud based on the acquired first condition 102.

(1-2) The information processing device 100 deploys the first job 101 to the created first execution environment 110, and executes the first job 101. The information processing device 100 deploys the first job 101 by activating the first job 101 and transferring the first job 101 to the created first execution environment 110.

(1-3) In response to completion of the first job 101, the information processing device 100 deletes the created first execution environment 110 in a case where the deletion condition 103 corresponding to the first job 101 is satisfied. For example, when the first job 101 is completed by predetermined timing, the information processing device 100 determines that the deletion condition 103 is satisfied, and deletes the first execution environment 110.

With this configuration, the information processing device 100 may achieve reduction in a workload imposed on an operator who manages an execution environment. The information processing device 100 may dispense with the need for the user to manually create or delete the execution environment for executing a job, and may achieve reduction in the workload imposed on the operator. Furthermore, the information processing device 100 may prevent an unnecessary execution environment from remaining on the cloud, and may suppress an increase in a use amount of resources.

(Example of Information Processing System 200)

Next, an example of an information processing system 200 to which the information processing device 100 illustrated in FIG. 1 is applied will be described with reference to FIG. 2.

Figure 2:
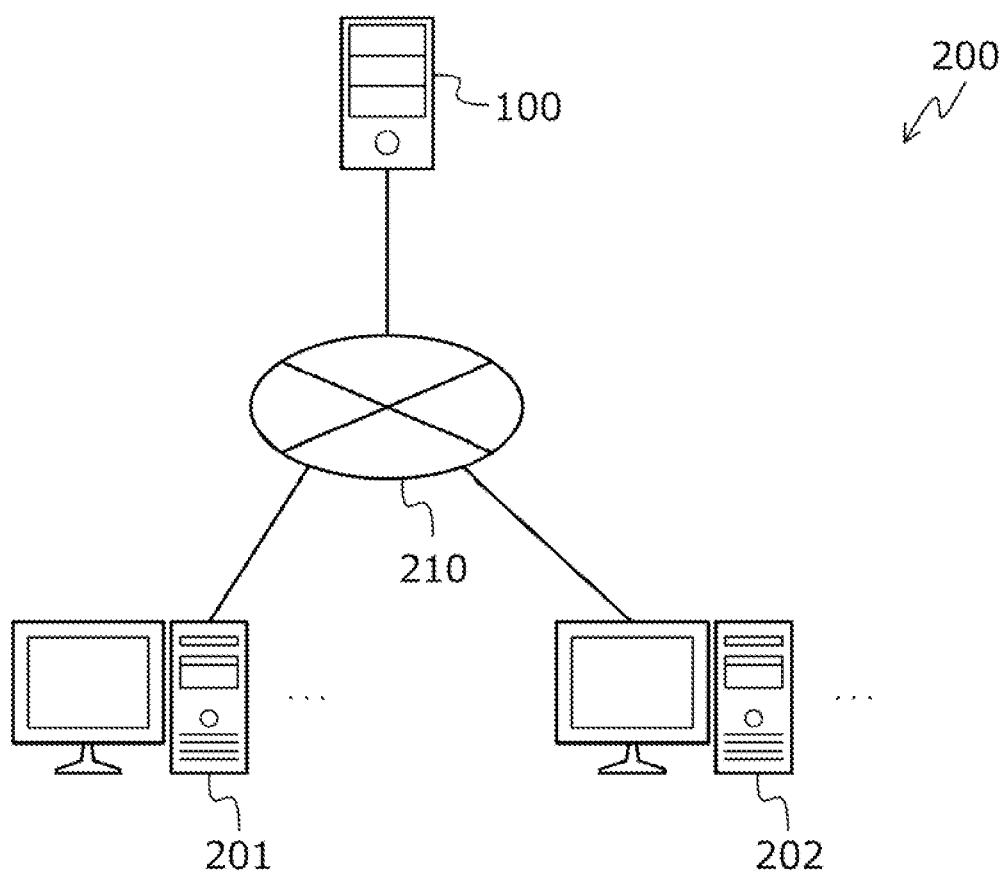
FIG. 2 is an explanatory diagram illustrating an example of an information processing system 200.

FIG. 2 is an explanatory diagram illustrating an example of the information processing system 200. In FIG. 2, the information processing system 200 includes the information processing device 100, a job execution device 201, and a client device 202.

In the information processing system 200, the information processing device 100 and the job execution device 201 are connected via a wired or wireless network 210. The network 210 is, for example, a local area network (LAN), a wide area network (WAN), the Internet, or the like. In the information processing system 200, the information processing device 100 and the client device 202 are connected via the wired or wireless network 210.

The information processing device 100 is a computer that creates a container. The information processing device 100 is provided on, for example, a cloud. The information processing device 100 receives, from the client device 202, a relationship between jobs in a job net, a condition of a container to which the jobs are deployed, and a schedule for activating the jobs. The information processing device 100 stores, for example, the received relationship between the jobs in the job net, condition of the container to which the jobs are deployed, and schedule for activating the jobs, by using a job net management table 400 described later with reference to FIG. 4. The information processing device 100 stores an image file of the container. For example, the information processing device 100 may receive the image file of the container from the client device 202, and store the image file.

The information processing device 100 creates the container. The information processing device 100 creates the container on the job execution device 201, for example. For example, the information processing device 100 creates, on the job execution device 201, a new container satisfying a condition of the container to which a job is deployed by using an image file of the container when activating the job, with reference to the job net management table 400 described later with reference to FIG. 4. The information processing device 100 stores attribute information of the newly created container in a container management table 500 described later with reference to FIG. 5. The information processing device 100 deploys the job to be activated to the newly created container, and executes the job.

The information processing device 100 may deploy the job to an existing container. For example, when activating the job, the information processing device 100 may retrieve an existing container satisfying the condition of the container to which the job is deployed with reference to the container management table 500 described later with reference to FIG. 5. For example, when the existing container is retrieved, the information processing device 100 determines whether or not the job to be activated and a past job deployed to the existing container match a combination of two linking jobs, with reference to the job net management table 400 described later with reference to FIG. 4. In the case of matching, the information processing device 100 deploys the job to be activated to the retrieved existing container, and executes the job to be activated.

In response to completion of the job, the information processing device 100 deletes the container to which the job is deployed when an end condition corresponding to the job is satisfied. For example, in a case where the job has a property of being repeatedly executed, the information processing device 100 determines whether or not the number of repetitions of the job is equal to or greater than a threshold, with reference to the job net management table 400 described later with reference to FIG. 4. When the number of repetitions of the job is less than the threshold, the information processing device 100 deletes the container to which the completed job is deployed at predetermined timing. The predetermined timing is, for example, date switching timing. Furthermore, for example, when the number of repetitions of the job is equal to or greater than the threshold, the information processing device 100 dispenses with the need to delete the container to which the job is deployed.

For example, the information processing device 100 may determine whether or not another job which is different from the completed job and scheduled to be executed later exists in the container to which the completed job is deployed, with reference to the job net management table 400 described later with reference to FIG. 4. When the another job does not exist, the information processing device 100 deletes the container to which the completed job is deployed at predetermined timing. The predetermined timing is, for example, date switching timing. For example, when the another job exists, the information processing device 100 dispenses with the need to delete the container until the another job is completed. The information processing device 100 is, for example, a server, a personal computer (PC), or the like.

The job execution device 201 is a computer that implements a container. The job execution device 201 is provided on, for example, a cloud. The job execution device 201 implements the container under the control of the information processing device 100. The job execution device 201 executes a job on the implemented container under the control of the information processing device 100. The job execution device 201 notifies the information processing device 100 that the job has been completed. The job execution device 201 deletes the container under the control of the information processing device 100. The job execution device 201 is, for example, a server, a PC, or the like.

The client device 202 is a computer used by a user. For example, based on an operation input by the user, the client device 202 transmits, to the information processing device 100, a relationship between jobs in a job net, a condition of a container to which the jobs are deployed, and a schedule for activating the jobs. The client device 202 is, for example, a server, a PC, a tablet terminal, a smartphone, or the like.

Here, the case has been described where the information processing device 100 and the job execution device 201 are different devices, but the present embodiment is not limited to this. For example, the information processing device 100 may have a function as the job execution device 201, and may also be operable as the job execution device 201.

Here, the case has been described where the information processing device 100 and the client device 202 are different devices, but the present embodiment is not limited to this. For example, the information processing device 100 may have a function as the client device 202, and may also be operable as the client device 202.

Hardware Configuration Example of Information Processing Device 100

Next, a hardware configuration example of the information processing device 100 will be described with reference to FIG. 3.

Figure 3:
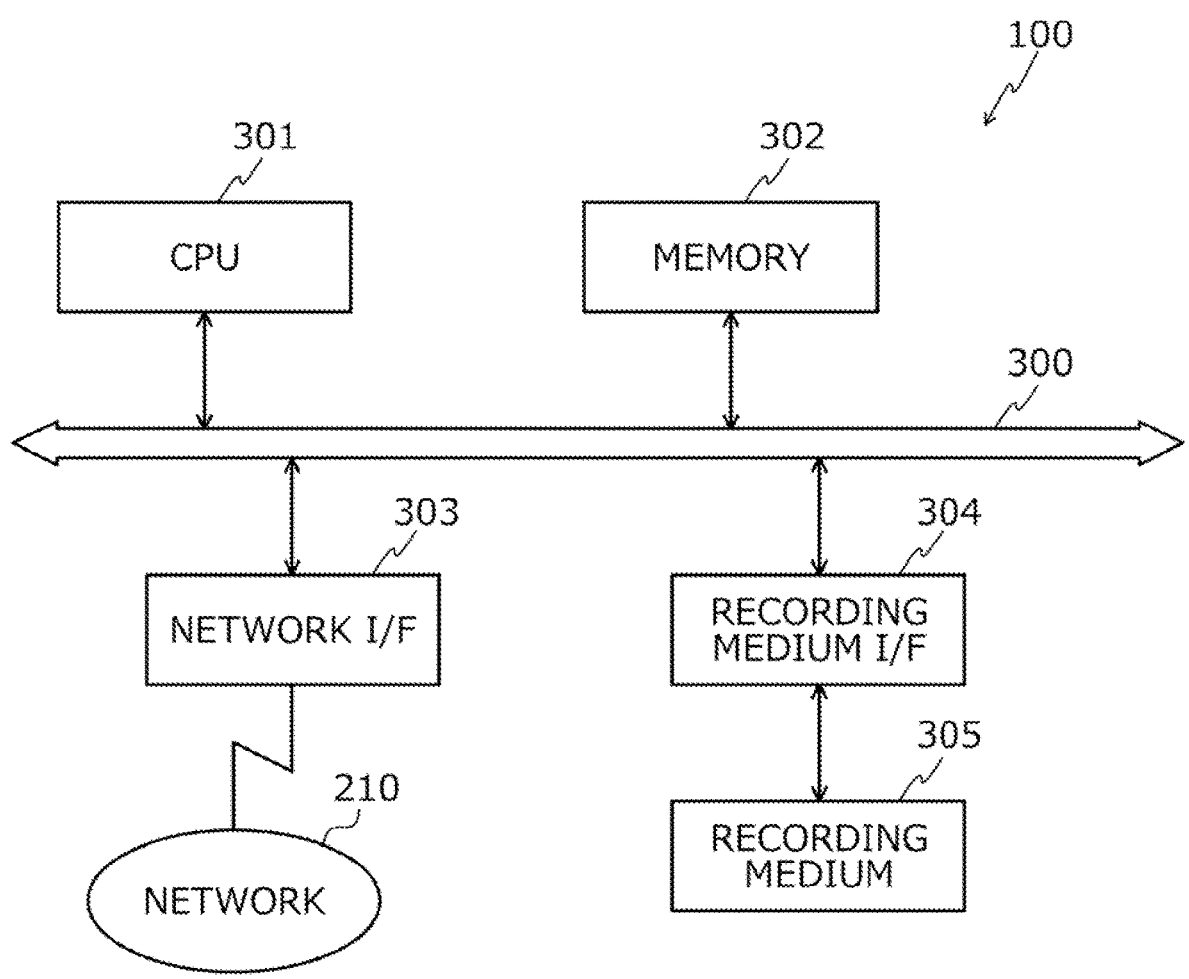
FIG. 3 is a block diagram illustrating a hardware configuration example of an information processing device 100.

FIG. 3 is a block diagram illustrating the hardware configuration example of the information processing device 100. In FIG. 3, the information processing device 100 includes a CPU 301, a memory 302, a network interface (I/F) 303, a recording medium I/F 304, and a recording medium 305. Furthermore, the individual components are connected to each other by a bus 300.

Here, the CPU 301 performs overall control of the information processing device 100. The memory 302 includes, for example, a read only memory (ROM), a random access memory (RAM), a flash ROM, and the like. For example, the flash ROM or the ROM stores various programs, and the RAM is used as a work area for the CPU 301. The programs stored in the memory 302 are loaded into the CPU 301 to cause the CPU 301 to execute coded processing.

The network I/F 303 is connected to the network 210 through a communication line, and is connected to another computer via the network 210. Additionally, the network I/F 303 manages an interface between the network 210 and the inside, and controls input and output of data from another computer. The network I/F 303 is, for example, a modem, a LAN adapter, or the like.

The recording medium I/F 304 controls reading and writing of data from and to the recording medium 305 under the control of the CPU 301. The recording medium I/F 304 is, for example, a disk drive, a solid state drive (SSD), a universal serial bus (USB) port, or the like. The recording medium 305 is a nonvolatile memory that stores data written under the control of the recording medium I/F 304. The recording medium 305 is, for example, a disk, a semiconductor memory, a USB memory, or the like. The recording medium 305 may be attachable to and detachable from the information processing device 100.

The information processing device 100 may include, for example, a keyboard, a mouse, a display, a printer, a scanner, a microphone, a speaker, or the like in addition to the components described above. Furthermore, the information processing device 100 may include a plurality of the recording medium I/Fs 304 and recording media 305. Furthermore, the information processing device 100 does not have to include the recording medium I/F 304 or the recording medium 305.

Content Stored in Job Net Management Table 400

Next, an example of content stored in the job net management table 400 will be described with reference to FIG. 4. The job net management table 400 is implemented by, for example, a storage area such as the memory 302 or the recording medium 305 of the information processing device 100 illustrated in FIG. 3.

FIG. 4 is an explanatory diagram illustrating an example of the content stored in the job net management table 400. As illustrated in FIG. 4, the job net management table 400 has fields for a job net name, a job number, a preceding job, an execution instance definition, a job exclusion flag, an activation condition, and an activation date. In the job net management table 400, job net management information is stored as a record 400-$a$ by setting information in each field for each job. An optional integer is represented by $a$.

In the field for the job net name, a job net name given to a job net to which a job belongs is set. In the field for the job number, a job number given to the job described above is set. In the field for the preceding job, a job number given to a preceding job which is another job to be executed immediately before the job described above, which belongs to the same job net as the job described above and is linked with the job described above, is set.

In the field for the execution instance definition, an execution instance name given to an execution instance definition indicating a condition of a container to which the job described above is deployed is set. In the field for the job exclusion flag, a job exclusion flag indicating a group of jobs that may be deployed to the same container within a job net is set. A plurality of jobs associated with the same job exclusion flag is preferably deployed to the same container. In the field for the activation condition, an activation condition indicating timing of activating the job described above is set. In the field for the activation date, a date for activating the job described above according to the activation condition described above is set.

Content Stored in Container Management Table 500

Next, an example of content stored in the container management table 500 will be described with reference to FIG. 5. The container management table 500 is implemented by, for example, a storage area such as the memory 302 or the recording medium 305 of the information processing device 100 illustrated in FIG. 3.

FIG. 5 is an explanatory diagram illustrating an example of the content stored in the container management table 500. As illustrated in FIG. 5, the container management table 500 has fields for an execution server container name, an execution instance definition, a job exclusion flag, and creation date and time. In the container management table 500, container management information is stored as a record 500-$b$ by setting information in each field for each container. An optional integer is represented by $b$.

In the field for the execution server container name, an execution server container name given to a container serving as an execution server to which a job is deployed is set. In the field for the execution instance definition, an execution instance name given to an execution instance definition indicating attribute and performance of the container described above is set. In the field for the job exclusion flag, a job exclusion flag included in the job deployed to the container described above is set. In the field for the creation date and time, creation date and time when the container described above is created is set.

(Content Stored in Instance Definition Management Table 600)

Next, an example of content stored in an instance definition management table 600 will be described with reference to FIG. 6. The instance definition management table 600 is implemented by, for example, a storage area such as the memory 302 or the recording medium 305 of the information processing device 100 illustrated in FIG. 3.

FIG. 6 is an explanatory diagram illustrating an example of the content stored in the instance definition management table 600. As illustrated in FIG. 6, the instance definition management table 600 has fields for an execution instance name, an execution server container image, deployment request information, and a deployment option. In the instance definition management table 600, instance definition management information is stored as a record 600-c by setting information in each field for each execution instance definition. An optional integer is represented by c.

In the field for the execution instance name, an execution instance name given to an execution instance definition is set. In the field for the execution server container image, an execution server container image corresponding to a container having performance indicated by the execution instance definition described above is set.

In the field for the deployment request information, deployment request information which is connection information to a cloud service application programming interface (API) for creating an execution server container is set. The field for the deployment request information includes fields for authentication information and a connection destination uniform resource locator (URL). In the field for the authentication information, authentication information is set. In the field for the connection destination URL, a connection destination URL is set.

The field for the deployment option includes fields for the number of CPUs, MEM, and an environment variable. In the field for the number of CPUs, the number of CPUs indicating the number of CPUs included in the container described above is set. In the field for the MEM, MEM indicating a size of a storage area included in the container described above is set. In the field for the environment variable, an environment variable set in the container described above is set.

(Hardware Configuration Example of Job Execution Device 201)

Since a hardware configuration example of the job execution device 201 is similar to the hardware configuration example of the information processing device 100 illustrated FIG. 3, for example, description thereof will be omitted.

Hardware Configuration Example of Client Device 202

Since a hardware configuration example of the client device 202 is similar to the hardware configuration example of the information processing device 100 illustrated in FIG. 3, for example, description thereof will be omitted.

Example of Functional Configuration of Information Processing Device 100

Next, an example of a functional configuration of the information processing device 100 will be described with reference to FIG. 7.

Figure 7:
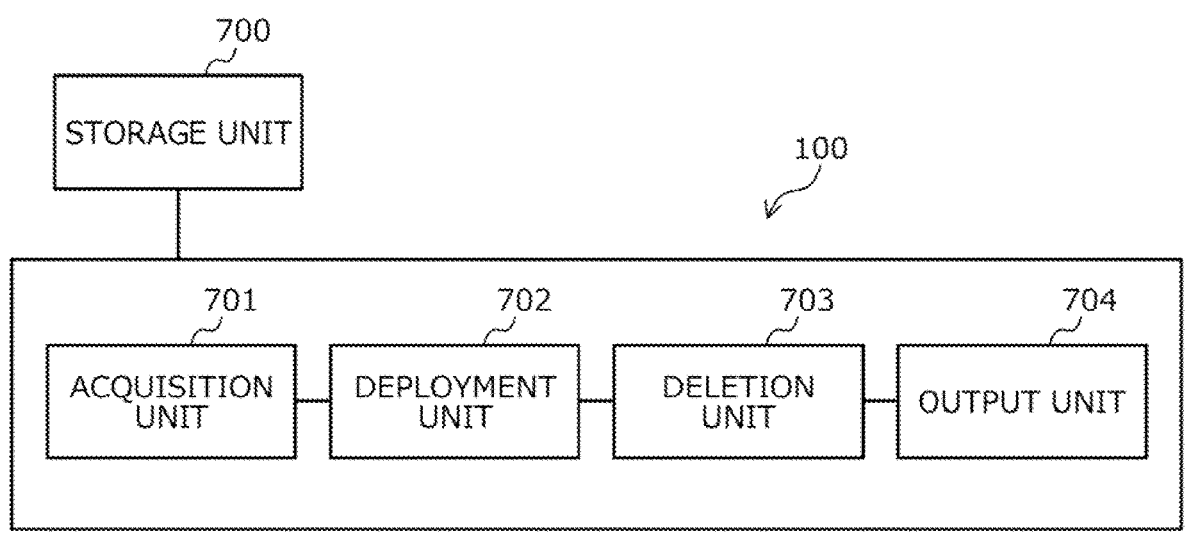
FIG. 7 is a block diagram illustrating an example of a functional configuration of the information processing device 100.

FIG. 7 is a block diagram illustrating an example of the functional configuration of the information processing device 100. The information processing device 100 includes a storage unit 700, an acquisition unit 701, a deployment unit 702, a deletion unit 703, and an output unit 704.

The storage unit 700 is implemented by, for example, a storage area such as the memory 302 or the recording medium 305 illustrated in FIG. 3. Hereinafter, a case will be described where the storage unit 700 is included in the information processing device 100, but the present embodiment is not limited to this. For example, the storage unit 700 may be included in a device different from the information processing device 100, and the information processing device 100 may refer to content stored in the storage unit 700.

The acquisition unit 701 to the output unit 704 function as an example of a control unit. For example, the acquisition unit 701 to the output unit 704 implement functions thereof by causing the CPU 301 to execute a program stored in a storage area such as the memory 302 or the recording medium 305 illustrated in FIG. 3, or by the network I/F 303. A processing result of each functional unit is stored in, for example, a storage area such as the memory 302 or the recording medium 305 illustrated in FIG. 3.

The storage unit 700 stores various types of information referred to or updated in processing of each functional unit. The storage unit 700 stores first information. The first information is information that makes it possible to specify, for each job, a condition of an execution environment to which the job is deployed. The execution environment is, for example, a container. The execution environment may be, for example, a virtual machine.

For example, the first information is information in which, for each job, an execution instance definition indicating a condition of a container to which the job is deployed is associated. For example, the storage unit 700 stores the first information in which, for each job, the execution instance definition indicating the condition of the container to which the job is deployed is associated, by using the job net management table 400 illustrated in FIG. 4.

For example, the first information may include, for each job, an execution schedule of the job. The execution schedule indicates, for example, whether or not the job is repeatedly executed. The execution schedule indicates, for example, a date when the job is executed. The first information is acquired by, for example, the acquisition unit 701. For example, the first information may be set in the storage unit 700 in advance by a user.

The storage unit 700 stores second information. The second information is information that makes it possible to specify a relationship between a plurality of jobs that is linked. The relationship is, for example, a relationship indicating order in which the plurality of jobs is executed, whether or not the plurality of jobs is linked, and the like. The link is, for example, exchange of data between the jobs. The link is, for example, use of data generated by a job in another job. The link may be, for example, the plurality of jobs operating while communicating with each other.

For example, the second information is information in which, for each job, in a case where there is a preceding job which is linked with the job and is to be executed immediately before the job, a job number given to the preceding job is associated. For example, the storage unit 700 stores the second information in which, for each job, the job number given to the preceding job which is linked with the job and is to be executed immediately before the job is associated, by using the job net management table 400 illustrated in FIG. 4. The second information is acquired by, for example, the acquisition unit 701. For example, the second information may be set in the storage unit 700 in advance by a user.

The storage unit 700 stores third information. The third information is information that makes it possible to specify a deletion condition corresponding to a job. The deletion condition corresponding to a job indicates, for example, a condition that triggers deletion of an execution environment to which the job is deployed.

The deletion condition corresponding to a job may be defined based on, for example, completion of the job. The deletion condition corresponding to a job may be defined based on, for example, an execution schedule of another job linked with the job. The deletion condition may be defined based on, for example, predetermined timing. The predetermined timing is timing of determining whether or not to delete an execution environment. The predetermined timing is, for example, date switching timing.

For example, the deletion condition indicates, as a condition, that a job has been completed before the predetermined timing. For example, the deletion condition indicates that the job has been completed after the predetermined timing when the job has not been completed by the predetermined timing.

For example, the deletion condition indicates, as a condition, that another job to be newly deployed to an execution environment to which a job is deployed does not exist by predetermined timing after the job has been completed. For example, the deletion condition indicates, as a condition, that another job has not been executed in an execution environment to which a job is deployed and that the job has been completed.

For example, the deletion condition indicates, as a condition, that, when a job has a property of being repeatedly executed, the number of times the job is repeatedly executed in a predetermined period is less than the predetermined number of times, and the job has been completed. For example, the deletion condition indicates, as a condition, that, when a job has a property of being repeatedly executed, and when the number of times the job is repeatedly executed in a predetermined period is equal to or greater than the predetermined number of times, the last executed job has been completed in the predetermined period.

For example, the deletion condition indicates, as a condition, that a condition of an execution environment to which a completed job is deployed does not match a condition of an execution environment to which another job linked with the completed job is deployed. The third information is acquired by, for example, the acquisition unit 701. For example, the third information may be set in the storage unit 700 in advance by a user.

The acquisition unit 701 acquires various types of information used for processing of each functional unit. The acquisition unit 701 stores the acquired various types of information in the storage unit 700, or outputs the acquired various types of information to each functional unit. Furthermore, the acquisition unit 701 may output the various types of information stored in the storage unit 700 to each functional unit. The acquisition unit 701 acquires the various types of information based on, for example, an operation input by a user. The acquisition unit 701 may receive the various types of information from, for example, a device different from the information processing device 100.

The acquisition unit 701 acquires the first information. The acquisition unit 701 acquires the first information by, for example, receiving the first information from another computer. The acquisition unit 701 may acquire the first information by, for example, accepting an input of the first information based on an operation input by a user.

The acquisition unit 701 acquires the second information. The acquisition unit 701 acquires the second information by, for example, receiving the second information from another computer. The acquisition unit 701 may acquire the second information by, for example, accepting an input of the second information based on an operation input by a user.

The acquisition unit 701 acquires the third information. The acquisition unit 701 acquires the third information by, for example, receiving the third information from another computer. The acquisition unit 701 may acquire the third information by, for example, accepting an input of the third information based on an operation input by a user.

With reference to the first information, the acquisition unit 701 acquires a first condition of an execution environment to which a first job is deployed. The first job is a job whose scheduled execution timing has come. The first job is a job to be activated. With reference to the first information, the acquisition unit 701 specifies the first job scheduled to be executed, and acquires the first condition of the execution environment to which the specified first job is deployed.

With reference to the first information, the acquisition unit 701 acquires a second condition of an execution environment to which a second job different from the first job is deployed. The second job is, for example, a job scheduled to be executed after the first job. For example, the second job may be a job linked with the first job. For example, with reference to the first information, the acquisition unit 701 specifies the second job scheduled to be executed, and acquires the second condition of the execution environment to which the second job is deployed.

With reference to the first information and the second information, the acquisition unit 701 acquires a third condition of an execution environment to which a third job which is different from the first job, is scheduled to be executed after the first job, and is linked with the first job is deployed. For example, with reference to the first information and the second information, the acquisition unit 701 specifies the third job which is scheduled to be executed after the first job and is linked with the first job, in response to completion of the first job. For example, with reference to the first information, the acquisition unit 701 acquires the third condition of the execution environment to which the specified third job is deployed.

The acquisition unit 701 may accept a start trigger to start processing of any one of the functional units. The start trigger is, for example, a predetermined operation input by a user. The start trigger may be, for example, reception of predetermined information from another computer. The start trigger may be, for example, an output of predetermined information by any one of the functional units. For example, the acquisition unit 701 accepts activation of a job as a start trigger to start processing of the deployment unit 702. For example, the acquisition unit 701 accepts completion of a job as a start trigger to start processing of the deletion unit 703.

The deployment unit 702 creates an execution environment to which a job is deployed, deploys the job to the created execution environment, and executes the job. The deployment unit 702 controls another computer capable of implementing an execution environment to which a job is deployed, causes the another computer to create an execution environment, deploys the job to the created execution environment, and causes the another computer to execute the job. The another computer is, for example, the job execution device 201, or the like.

For example, the deployment unit 702 creates, based on an acquired first condition, a first execution environment to which a first job is deployed, deploys the first job to the created first execution environment, and executes the first job. For example, the deployment unit 702 creates the first execution environment satisfying the acquired first condition, deploys the first job to the created first execution environment, and executes the first job. With this configuration, for example, the deployment unit 702 may make it possible to automatically execute the first job, and may achieve reduction in a workload imposed on a user.

For example, with reference to acquired second information, the deployment unit 702 deploys a second job to the first execution environment to which the first job is deployed, and executes the second job, in a case where the second job is scheduled to be executed after the first job and is linked with the first job. For example, with reference to the second information, the deployment unit 702 determines whether or not the second job is scheduled to be executed after the first job and is linked with the first job. For example, the deployment unit 702 determines whether or not the first condition and the second condition match.

The match indicates, for example, that the first condition and the second condition are the same. The match may indicate, for example, that the first condition includes the second condition. For example, the match may indicate that the number of CPUs indicated by the first condition is greater than the number of CPUs indicated by the second condition. For example, the match may indicate that a size of a storage area indicated by the first condition is greater than a size of a storage area indicated by the second condition.

For example, the deployment unit 702 deploys the second job to the first execution environment to which the first job is deployed, and executes the second job, in a case where it is determined that the second job is scheduled to be executed after the first job and is linked with the first job, and that the first condition and the second condition match. With this configuration, for example, the deployment unit 702 may make it possible to automatically execute the second job, and may achieve reduction in a workload imposed on a user. For example, the deployment unit 702 may deploy the second job to an existing execution environment, and may suppress an increase in a use amount of resources. The resources may be, for example, computational resources, time resources, human resources, financial resources, or the like.

For example, the deployment unit 702 creates a second execution environment to which the second job is deployed, deploys the second job to the created second execution environment, and executes the second job, in a case where it is determined that the second job is not linked with the first job. With this configuration, for example, the deployment unit 702 may make it possible to automatically execute the second job, and may achieve reduction in a workload imposed on a user. For example, the deployment unit 702 may avoid erroneously deploying the second job that may not be executed in the same execution environment as the first job to the same execution environment as the first job, and may make it possible to appropriately execute the second job.

For example, the deployment unit 702 creates the second execution environment to which the second job is deployed, deploys the second job to the created second execution environment, and executes the second job, in a case where it is determined that the second job is linked with the first job and that the first condition and the second condition do not match. With this configuration, for example, the deployment unit 702 may make it possible to automatically execute the second job, and may achieve reduction in a workload imposed on a user. For example, the deployment unit 702 may avoid erroneously deploying the second job that may not be executed in the same execution environment as the first job to the same execution environment as the first job, and may make it possible to appropriately execute the second job.

The deployment unit 702 backs up the overall information of the created execution environment. When the created execution environment is abnormal, the deployment unit 702 restores the created execution environment based on the backed-up overall information of the execution environment. For example, the deployment unit 702 controls another computer that implements the execution environment, and causes the another computer to back up the overall information of the execution environment. The another computer is, for example, the job execution device 201, or the like. The abnormality is, for example, that the another computer is down.

For example, when the execution environment is abnormal, the deployment unit 702 controls the another computer that implements the execution environment, and causes the another computer to restore the execution environment based on the backed-up overall information of the execution environment. With this configuration, the deployment unit 702 may cope with abnormality of the execution environment, and may achieve improvement in stability of the information processing system 200. The deployment unit 702 may achieve reduction in a probability of failing to execute a job.

The deletion unit 703 deletes an execution environment with reference to the storage unit 700. For example, in response to completion of a first job, the deletion unit 703 deletes a created first execution environment to which the first job is deployed in a case where a deletion condition corresponding to the first job is satisfied. For example, the deletion unit 703 controls another computer that implements the first execution environment, and causes the another computer to delete the first execution environment. The another computer is, for example, the job execution device 201, or the like.

For example, in a case where the first job has been completed by predetermined timing, the deletion unit 703 deletes the first execution environment to which the first job is deployed by the predetermined timing. With this configuration, the deletion unit 703 may suppress an increase in a use amount of resources.

For example, in a case where the first job has not been completed by the predetermined timing, the deletion unit 703 does not delete the first execution environment to which the first job is deployed until the first job is completed, and deletes the first execution environment to which the first job is deployed after the first job is completed. With this configuration, the deletion unit 703 may suppress an increase in a use amount of resources. The deletion unit 703 may make it possible to complete the first job normally.

For example, in a case where another job to be newly deployed to the first execution environment to which the first job is deployed does not exist by predetermined timing after the first job has been completed, the deletion unit 703 deletes the first execution environment to which the first job is deployed by the predetermined timing. With this configuration, the deletion unit 703 may suppress an increase in a use amount of resources.

For example, the deletion unit 703 determines whether or not a first condition and an acquired third condition match when a third job which is scheduled to be executed after the first job and is linked with the first job exists. The third job is a candidate for the another job to be newly deployed to the first execution environment to which the first job is deployed. For example, in the case of non-matching, the deletion unit 703 deletes the first execution environment to which the first job is deployed, in response to completion of the first job. With this configuration, the deletion unit 703 may suppress an increase in a use amount of resources.

For example, when another job is executed in the first execution environment to which the first job is deployed, the deletion unit 703 dispenses with the need to delete the first execution environment to which the first job is deployed. For example, when another job is not executed in the first execution environment to which the first job is deployed, the deletion unit 703 deletes the first execution environment to which the first job is deployed, in response to completion of the first job. With this configuration, the deletion unit 703 may suppress an increase in a use amount of resources. The deletion unit 703 may make it possible to complete the another job normally.

For example, when the first job has a property of being repeatedly executed, the deletion unit 703 determines whether or not the number of repetitions of the first job is equal to or greater than the predetermined number of times in a predetermined period. The predetermined period is, for example, one day. The number of repetitions is the number of times a job is repeatedly executed. The number of repetitions is, for example, the number of times a job is scheduled to be repeatedly executed. For example, in a case where the number of repetitions of the first job is less than the predetermined number of times, the deletion unit 703 deletes the first execution environment to which the first job is deployed in response to completion of the first job. With this configuration, the deletion unit 703 may suppress an increase in a use amount of resources.

For example, in a case where the number of repetitions of the first job is equal to or greater than the predetermined number of times, the deletion unit 703 deletes the first execution environment to which the first job is deployed in response to completion of the first job last executed in the predetermined period. With this configuration, the deletion unit 703 may suppress an increase in a use amount of resources. The deletion unit 703 may make it easier to avoid delay in timing of starting execution of the first job by repeating creation and deletion of the first execution environment.

The output unit 704 outputs a processing result of at least any one of the functional units. An output format is, for example, display on a display, print output to a printer, transmission to an external device by the network I/F 303, or storage in a storage area such as the memory 302 or the recording medium 305. With this configuration, the output unit 704 may make it possible for a user to be notified of the processing result of at least any one of the functional units, and may achieve improvement in convenience of the information processing device 100.

The output unit 704 outputs, for example, that an execution environment has been created so that a user may refer to that. With this configuration, the output unit 704 may make it easier for the user to grasp a state of the information processing system 200, and make it easier to manage the information processing system 200. The output unit 704 outputs, for example, that the execution environment has been deleted so that the user may refer to that. With this configuration, the output unit 704 may make it easier for the user to grasp a state of the information processing system 200, and make it easier to manage the information processing system 200.

The output unit 704 outputs, for example, that a job has been executed so that a user may refer to that. With this configuration, the output unit 704 may make it easier for the user to grasp a state of the information processing system 200, and make it easier to manage the information processing system 200. The output unit 704 outputs, for example, a result of executing the job so that the user may refer to the result. With this configuration, the output unit 704 may make it possible for the user to use the result of executing the job.

Specific Example of Functional Configuration of Information Processing Device 100

Next, a specific example of the functional configuration of the information processing device 100 will be described with reference to FIG. 8.

Figure 8:
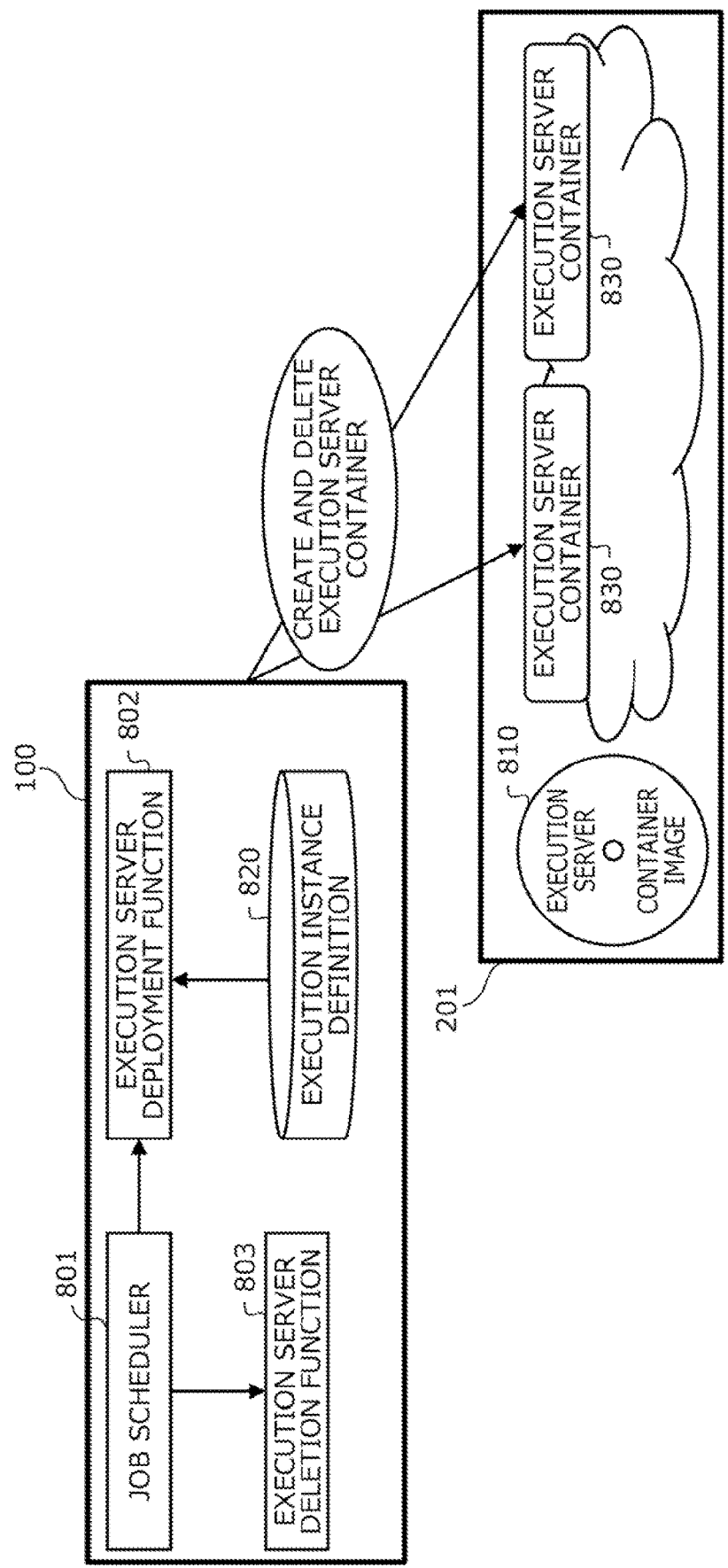
FIG. 8 is a block diagram illustrating a specific example of the functional configuration of the information processing device 100.

FIG. 8 is a block diagram illustrating the specific example of the functional configuration of the information processing device 100. The information processing device 100 includes a job scheduler 801, an execution server deployment function 802, and an execution server deletion function 803. The information processing device 100 includes an execution instance definition 820. The execution instance definition 820 is stored in, for example, the instance definition management table 600 illustrated in FIG. 6.

An execution server container image 810 is registered in advance by a user in a repository that may be used by the job execution device 201. The execution server container image 810 is information for implementing a container. The job execution device 201 implements an execution server container 830. The execution server container 830 is a container that implements functions as an execution server. For example, the job execution device 201 implements the execution server container 830 by using the execution server container image 810. The job execution device 201 is provided on, for example, a cloud.

The job scheduler 801 controls timing of activating a job. The job scheduler 801 transmits a notification that the timing of activating the job has come to the execution server deployment function 802. The notification includes, for example, information identifying the job.

The job scheduler 801 monitors the job execution device 201, and detects that the job has been completed in the job execution device 201. The job scheduler 801 detects that the job has been completed in the job execution device 201 by, for example, receiving a notification that the job has been completed from the job execution device 201. For example, the job scheduler 801 may detect that any job has been completed in the job execution device 201 by periodically inquiring about a job execution situation in the job execution device 201. The job scheduler 801 transmits the notification that the job has been completed to the execution server deletion function 803. The notification includes, for example, information identifying the job.

The execution server deployment function 802 accepts a notification that timing of activating a job has come. The execution server deployment function 802 acquires the execution instance definition 820 corresponding to the job whose activation timing has come. The execution server deployment function 802 requests the job execution device 201 to implement the execution server container 830 by using the execution server container image 810 corresponding to the acquired execution instance definition 820. In response to the request, the execution server deployment function 802 causes the job execution device 201 to activate the execution server container image 810 registered in the repository, and to create the execution server container 830. The execution server deployment function 802 causes the execution server container 830 created by the job execution device 201 to execute the job whose activation timing has come.

The job execution device 201 executes the job by the execution server container 830. When the job is completed by the execution server container 830, the job execution device 201 transmits a notification that the job has been completed to the job scheduler 801. The job execution device 201 may transmit a job execution situation in the execution server container 830 to the job scheduler 801 in response to an inquiry from the job scheduler 801.

The execution server deletion function 803 accepts a notification that a job has been completed. The execution server deletion function 803 determines whether or not a deletion condition for deleting the execution server container 830 whose job has been completed is satisfied. When the deletion condition is satisfied, the execution server deletion function 803 deletes the execution server container 830 whose job has been completed. An example of determining whether or not the deletion condition is satisfied will be described later, for example, with reference to FIGS. 14 to 17.

With this configuration, the information processing device 100 may achieve reduction in a workload imposed on an operator who manages the execution server container 830. The information processing device 100 may dispense with the need for the user to manually create or delete the execution server container 830 that executes a job, and may achieve reduction in the workload imposed on the operator. Furthermore, the information processing device 100 may prevent an unnecessary execution server container 830 from remaining on the cloud, and may suppress the increase in use amount of resources.

Example of Implementing Information Processing System 200

Next, an example of implementing the information processing system 200 will be described with reference to FIG. 9.

Figure 9:
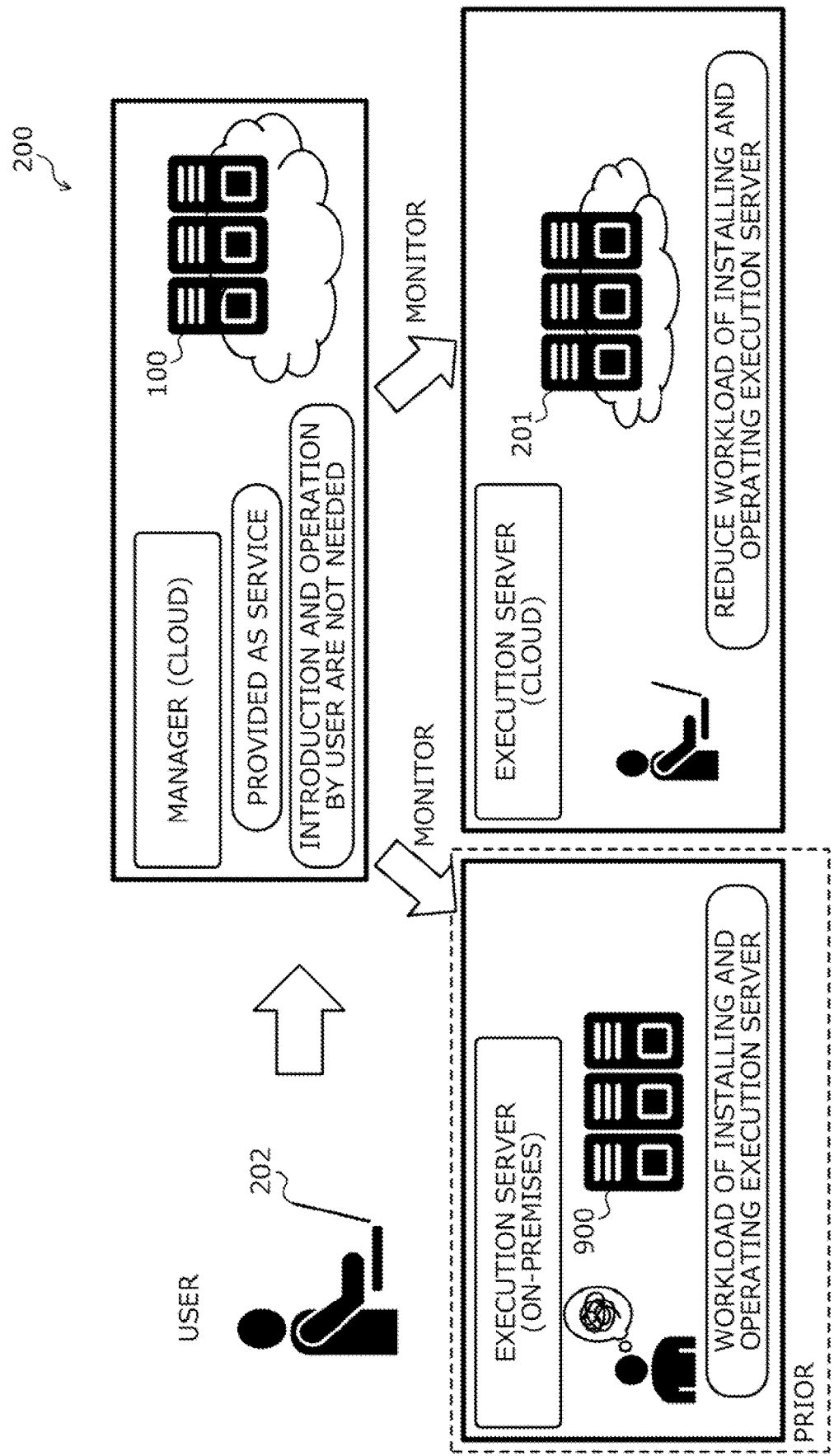
FIG. 9 is an explanatory diagram illustrating an example of implementing the information processing system 200.

FIG. 9 is an explanatory diagram illustrating an example of implementing the information processing system 200. As illustrated in FIG. 9, in the information processing system 200, the information processing device 100 serving as a manager is provided on a cloud. Furthermore, in the information processing system 200, the job execution device 201 that implements functions as an execution server by an execution server container is provided on the cloud.

Here, the manager is provided to a user as a service by the information processing device 100. Thus, the user does not have to introduce and operate a computer serving as the manager in the information processing system 200, and may achieve reduction in a workload.

Furthermore, the job execution device 201 creates or deletes the execution server container at appropriate timing under the control of the information processing device 100. Thus, the user does not have to introduce and operate a computer serving as the execution server in the information processing system 200, and may achieve reduction in the workload. The user does not have to manage the job execution device 201 so as to create or delete the execution server container at appropriate timing, and may achieve reduction in the workload.

On the other hand, in a prior method, it is conceivable that a user introduces and operates a computer 900 serving as an execution server so that a job is executed under the control of a computer serving as a manager. In the prior method, the computer 900 is provided on-premises, for example. The computer 900 may be provided on a cloud, for example. Thus, in the prior method, an increase in a workload imposed on the user is incurred. On the other hand, according to the information processing system 200, it is possible to achieve reduction in the workload imposed on the user.

Here, for convenience of description, the case has been described where the information processing system 200 does not include the computer 900 serving as the execution server provided on-premises, but the present embodiment is not limited to this. For example, the information processing system 200 may include both the computer 900 serving as the execution server provided on-premises and the job execution device 201 implementing the functions as the execution server. Additionally, for example, the information processing device 100 may deploy a job to the computer 900 serving as the execution server provided on-premises and the job execution device 201 implementing the functions as the execution server, and cause the job to be executed.

Example of Operation of Information Processing Device 100

Next, an example of operation of the information processing device 100 will be described with reference to FIGS. 10 to 17. First, an example in which the information processing device 100 controls the job execution device 201 and creates an execution server container in the job execution device 201 will be described with reference to FIGS. 10 to 13.

Figure 10:
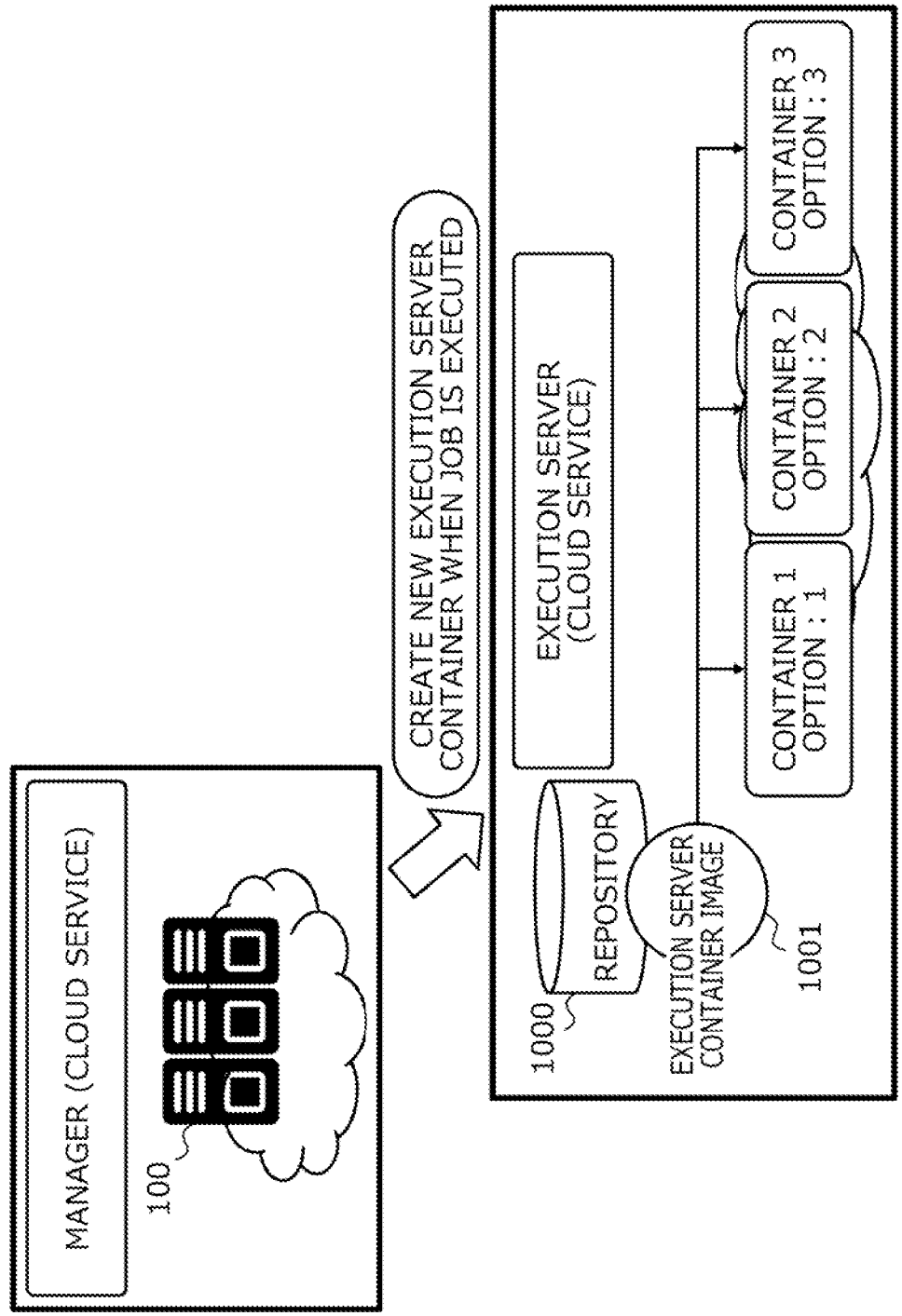
FIG. 10 is an explanatory diagram (part 1) illustrating an example of creating an execution server container.

FIGS. 10 to 13 are explanatory diagrams illustrating an example of creating an execution server container. In FIG. 10, a repository 1000 exists on a cloud. The repository 1000 is implemented by, for example, the job execution device 201.

The client device 202 transmits an execution server container image 1001 to the job execution device 201 based on an operation input by a user. The execution server container image 1001 includes, for example, static definition values. For example, the execution server container image 1001 includes definition values such as an execution module and a backward compatibility parameter. The job execution device 201 receives the execution server container image 1001 from the client device 202, and stores the execution server container image 1001 in the repository 1000.

The client device 202 creates an execution instance definition and transmits the execution instance definition to the information processing device 100 based on an operation input by the user. The execution instance definition includes, for example, a deployment option. For example, the deployment option includes definition values specified by the user. For example, the definition values indicate a password of a job owner, an output destination of a log or the like, a setting value of a queue, specification of a CPU of an execution server container, specification of MEM of the execution server container, and the like. The client device 202 sets a network job input destination and transmits the network job input destination to the information processing device 100, based on an operation input by the user.

The information processing device 100 determines automatic setting values. The automatic setting values include a trusted host definition, a monitoring host definition, and the like. The information processing device 100 receives the execution instance definition from the client device 202.

The information processing device 100 causes the job execution device 201 to create an execution server container to which a job is deployed based on the execution instance definition of the job and the automatic setting values according to an execution schedule of the job. For example, the information processing device 100 causes any one of the job execution devices 201 to create a container 1, a container 2, a container 3, and the like. For example, the information processing device 100 may cause one job execution device 201 to create a plurality of containers. The information processing device 100 deploys the job to the created execution server container, and causes the execution server container to execute the job.

In a case where the execution server container is created to execute the job, the job execution device 201 may back up the overall execution server container by using a setting function of a reactivation point at each predetermined timing. The reactivation point may be set for each job. The job execution device 201 may achieve reduction in a probability of failing to execute the job by restoring the backed-up overall execution server container after its own device is down. Next, description of FIG. 11 will be made, and content 1100 of an execution instance definition will be described.

Figure 11:
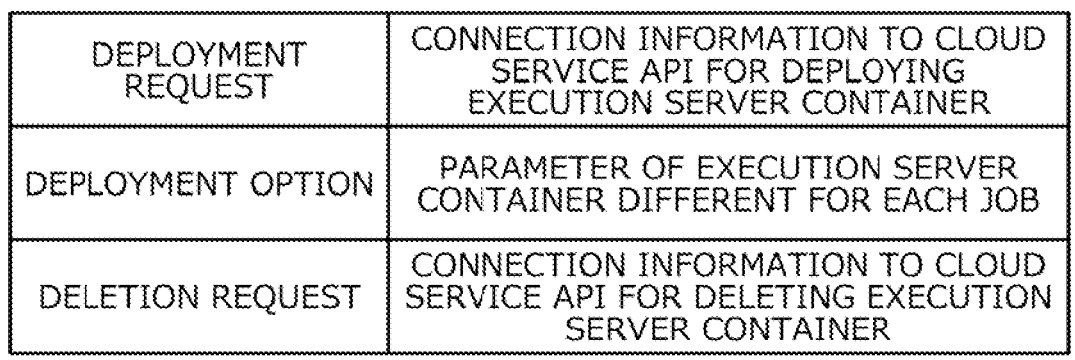
FIG. 11 is an explanatory diagram (part 2) illustrating an example of creating the execution server container.

FIG. 11 illustrates the content 1100 of the execution instance definition. The content 1100 includes a deployment request, a deployment option, and a deletion request. The deployment request is, for example, connection information to a cloud service API for deploying an execution server container. The deployment option is, for example, a parameter of an execution server container, which is different for each job. For example, the parameter indicates a password of a job owner, an output destination of a log or the like, a setting value of a queue, specification of a CPU of an execution server container, specification of MEM of the execution server container, and the like. The deletion request is, for example, connection information to a cloud service API for deleting an execution server container. Next, description of FIGS. 12 and 13 will be made, and a specific example in which the information processing device 100 performs control to create an execution server container to which a job is deployed will be described.

Figure 12:
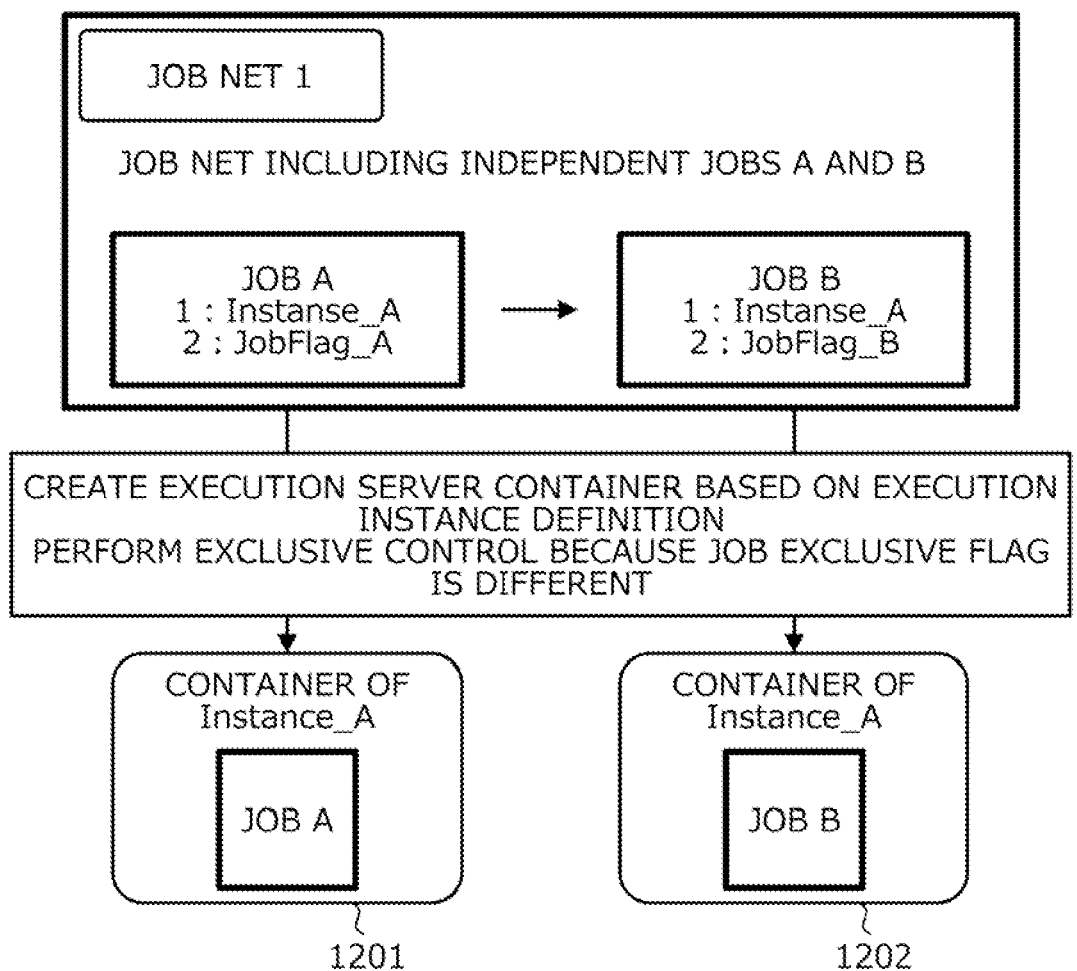
FIG. 12 is an explanatory diagram (part 3) illustrating an example of creating the execution server container.
Figure 13:
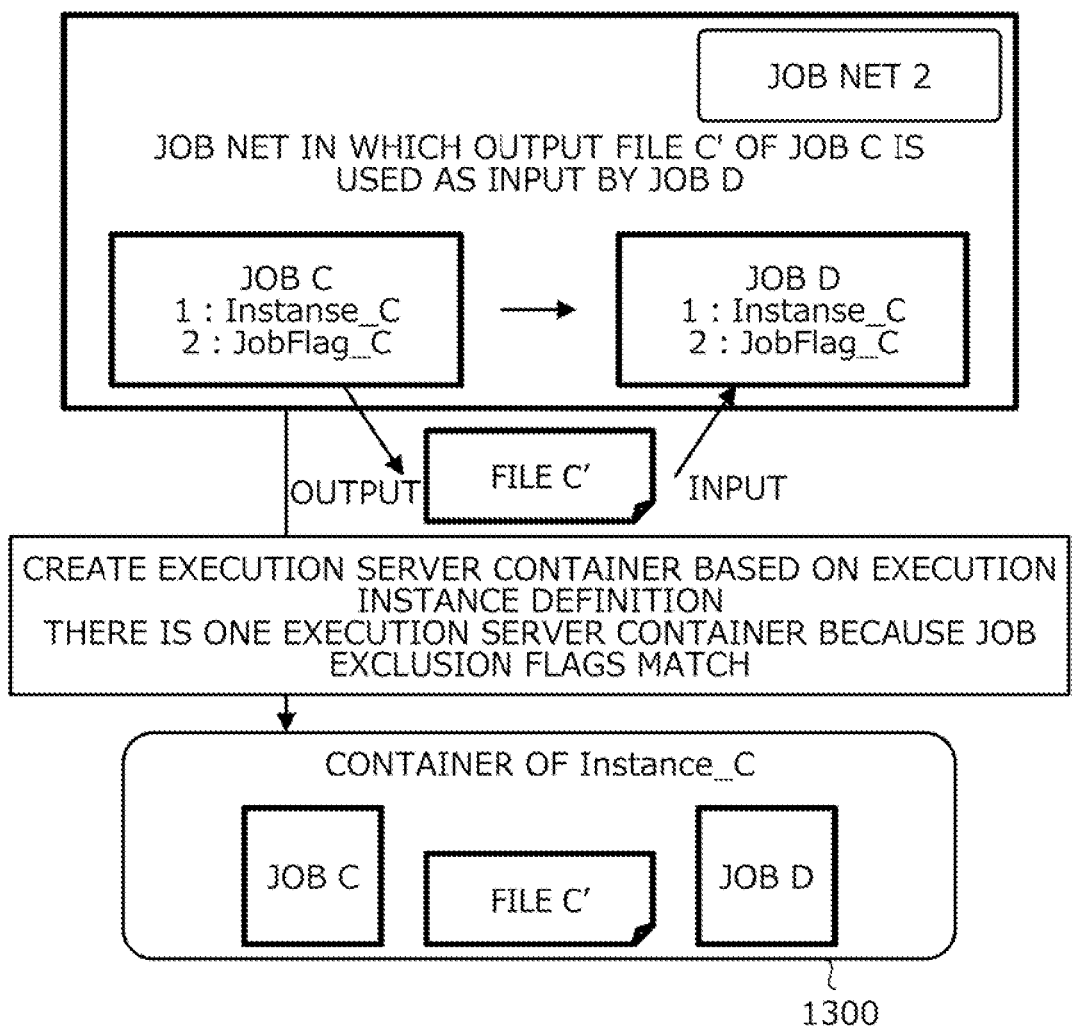
FIG. 13 is an explanatory diagram (part 4) illustrating an example of creating the execution server container.

FIGS. 12 and 13 illustrate the specific example in which the information processing device 100 performs control to create an execution server container to which a job is deployed. In FIG. 12, it is assumed that a job A and a job B belonging to a job net 1 exist. The job A is associated with an execution instance definition=Instance_A and a job exclusion flag=JobFlag_A. The job B is associated with an execution instance definition=Instance_A and a job exclusion flag=JobFlag_B. The job A is scheduled to be executed before the job B.

The information processing device 100 creates, in the job execution device 201, an execution server container 1201 satisfying the execution instance definition=Instance_A corresponding to the job A at timing of activating the job A. The information processing device 100 stores, by using the container management table 500, the execution instance definition=Instance_A and the job exclusion flag=JobFlag_A corresponding to the job A in association with the created execution server container 1201. The information processing device 100 deploys the job A to the created execution server container 1201, and causes the execution server container 1201 to execute the job A.

The information processing device 100 specifies the job A preceding the job B with reference to the job net management table 400 at timing of activating the job B. The information processing device 100 acquires the execution instance definition=Instance_A corresponding to the execution server container 1201 to which the preceding job A is deployed, with reference to the container management table 500. The information processing device 100 determines whether or not the acquired execution instance definition=Instance_A matches the execution instance definition=Instance_A corresponding to the job B.

Here, since it is determined that they match, the information processing device 100 acquires the job exclusion flag=JobFlag_A corresponding to the execution server container 1201 to which the preceding job A is deployed, with reference to the container management table 500. The information processing device 100 determines whether or not the acquired job exclusion flag=JobFlag_A matches the job exclusion flag=JobFlag_B corresponding to the job B.

Here, since it is determined that they do not match, the information processing device 100 creates, in the job execution device 201, an execution server container 1202 satisfying the execution instance definition=Instance_A corresponding to the job B. The information processing device 100 stores, by using the container management table 500, the execution instance definition=Instance_A and the job exclusion flag=JobFlag_B corresponding to the job B in association with the created execution server container 1202. The information processing device 100 deploys the job B to the created execution server container 1202, and causes the execution server container 1202 to execute the job B. With this configuration, the information processing device 100 may make it possible to appropriately execute the job A and the job B. Next, description of FIG. 13 will be made.

In FIG. 13, it is assumed that a job C and a job D belonging to a job net 2 exist. The job C is associated with an execution instance definition=Instance_C and a job exclusion flag=JobFlag_C. The job D is associated with an execution instance definition=Instance_C and a job exclusion flag=JobFlag_C. The job C is scheduled to be executed before the job D. The job D is a job that uses an output file C' of the job C as an input.

The information processing device 100 creates, in the job execution device 201, an execution server container 1300 satisfying the execution instance definition=Instance_C corresponding to the job C at timing of activating the job C. The information processing device 100 stores, by using the container management table 500, the execution instance definition=Instance_C and the job exclusion flag=JobFlag_C corresponding to the job C in association with the created execution server container 1300. The information processing device 100 deploys the job C to the created execution server container 1300, and causes the execution server container 1300 to execute the job C.

The information processing device 100 specifies the job C preceding the job D with reference to the job net management table 400 at timing of activating the job D. The information processing device 100 acquires the execution instance definition=Instance_C corresponding to the execution server container 1300 to which the preceding job C is deployed, with reference to the container management table 500. The information processing device 100 determines whether or not the acquired execution instance definition=Instance_C matches the execution instance definition=Instance_C corresponding to the job D.

Here, since it is determined that they match, the information processing device 100 acquires the job exclusion flag=JobFlag_C corresponding to the execution server container 1300 to which the preceding job C is deployed, with reference to the container management table 500. The information processing device 100 determines whether or not the acquired job exclusion flag=JobFlag_C matches the job exclusion flag=JobFlag_C corresponding to the job D.

Here, since it is determined that they match, the information processing device 100 determines that it is preferable to deploy the job C and the job D to the same execution server container 1300. Thus, the information processing device 100 deploys the job D to the existing execution server container 1300 and causes the existing execution server container 1300 to execute the job D without creating a new execution server container.

With this configuration, the information processing device 100 may make it possible to appropriately execute the job C and the job D. The information processing device 100 may make it possible for the job C and the job D to efficiently exchange the output file C'. Thus, the information processing device 100 may achieve improvement in job processing efficiency. The information processing device 100 may suppress an increase in a use amount of resources without creating a new execution server container. Next, an example in which the information processing device 100 deletes an execution server container will be described with reference to FIGS. 14 to 17.

FIGS. 14 to 17 are explanatory diagrams illustrating an example of deleting the execution server container. In FIGS. 14 to 17, the information processing device 100 determines whether or not to delete the execution server container based on, for example, an operation date of a job. First, description of FIG. 14 will be made.

Figure 14:
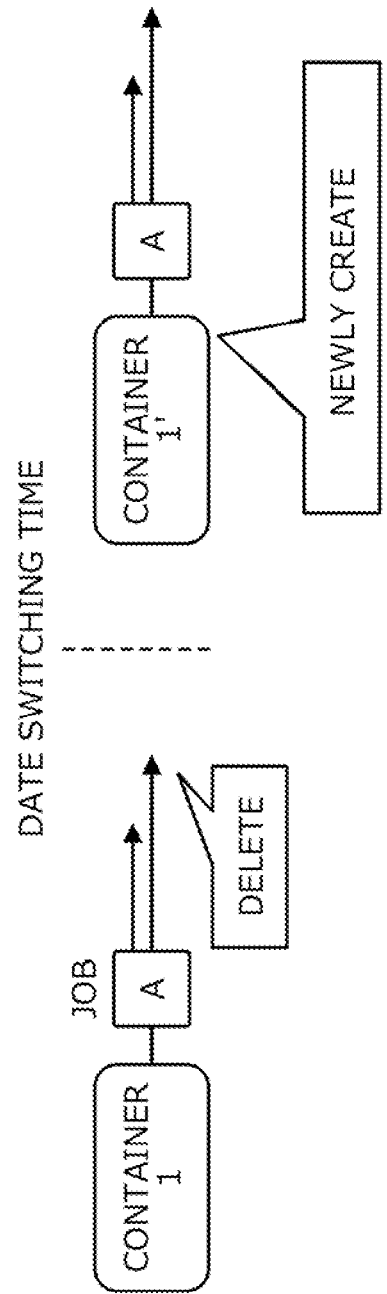
FIG. 14 is an explanatory diagram (part 1) illustrating an example of deleting the execution server container.

In FIG. 14, it is assumed that a job A is, for example, a job activated once on an operation date. It is assumed that a container 1 exists as the execution server container. It is assumed that the container 1 executes the job A and completes the job A.

The information processing device 100 determines, in a case where the job A is completed, whether or not another job to be executed in the container 1 during the same operation date exists. The information processing device 100 determines whether or not another job to be executed in the container 1 during the same operation date exists with reference to, for example, the job net management table 400, the container management table 500, and the like.

When another job to be executed in the container 1 during the same operation date does not exist, the information processing device 100 controls the job execution device 201 to delete the container 1 in response to the completion of the job A before a date switching time. The information processing device 100 newly creates a container 1' in a case where the job A is activated again on the next operation date.

With this configuration, when an execution server container that has not been used for a certain time or more exists, the information processing device 100 may delete the execution server container, and may suppress an increase in a use amount of resources. Next, description of FIG. 15 will be made.

Figure 15:
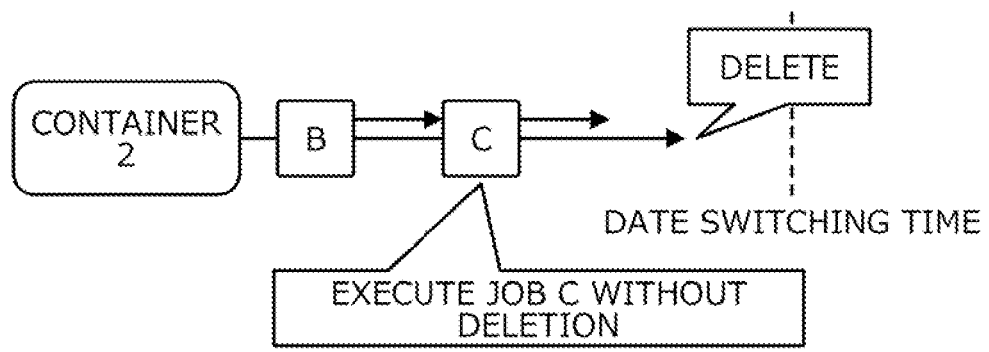
FIG. 15 is an explanatory diagram (part 2) illustrating an example of deleting the execution server container.

In FIG. 15, it is assumed that a job B is, for example, a job activated once on an operation date. It is assumed that a job C is, for example, a job activated once on the operation date after completion of the job B. It is assumed that a container 2 exists as the execution server container. It is assumed that the container 2 executes the job B and completes the job B.

The information processing device 100 determines, in a case where the job B is completed, whether or not another job to be executed in the container 2 during the same operation date exists. The information processing device 100 determines whether or not another job to be executed in the container 2 during the same operation date exists with reference to, for example, the job net management table 400, the container management table 500, and the like. In the example of FIG. 15, the information processing device 100 determines that the job C to be executed in the container 2 during the same operation date exists.

Since another job to be executed in the container 2 during the same operation date exists, the information processing device 100 determines that it is preferable to leave the container 2 until completion of the another job. It is assumed that the container 2 executes the job C after completion of the job B, and completes the job C.

The information processing device 100 determines, in a case where the job C is completed, whether or not another job to be executed in the container 2 during the same operation date exists. Since another job to be executed in the container 2 during the same operation date does not exist, the information processing device 100 controls the job execution device 201 to delete the container 2 in response to the completion of the job C before a date switching time.

With this configuration, the information processing device 100 may dispense with the need to delete an execution server container in which an execution schedule of a job remains, may suppress an increase in a use amount of resources, and may make it easier to suppress overhead when executing the job. Next, description of FIG. 16 will be made.

Figure 16:
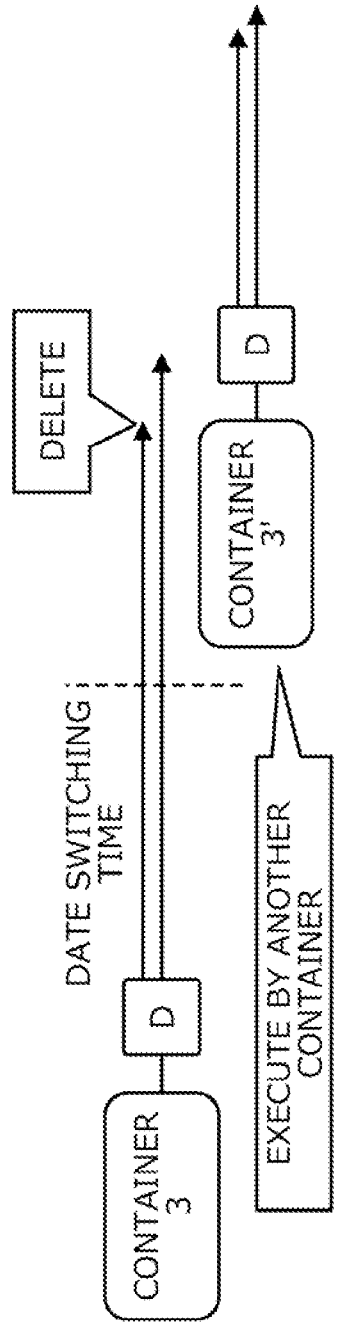
FIG. 16 is an explanatory diagram (part 3) illustrating an example of deleting the execution server container.

In FIG. 16, it is assumed that a job D is, for example, a job activated a plurality of times on an operation date. It is assumed that a container 3 exists as the execution server container. It is assumed that the container 3 executes the job D.

The information processing device 100 determines whether or not the job D is completed at a date switching time. Since it is determined that the job D is not completed, the information processing device 100 leaves the container 3 until the job D is completed. Thereafter, in a case where the job D is completed, the information processing device 100 deletes the container 3 when another job to be executed in the container 3 during the same operation date does not exist. Furthermore, in a case where the job D is newly activated before deleting the container 3, the information processing device 100 creates another container 3' different from the container 3, deploys the job D to the container 3', and causes the container 3' to execute the job D.

With this configuration, the information processing device 100 may dispense with the need to delete an execution server container that is executing a job, and may achieve reduction in a probability of failing to execute the job. Next, description of FIG. 17 will be made.

Figure 17:
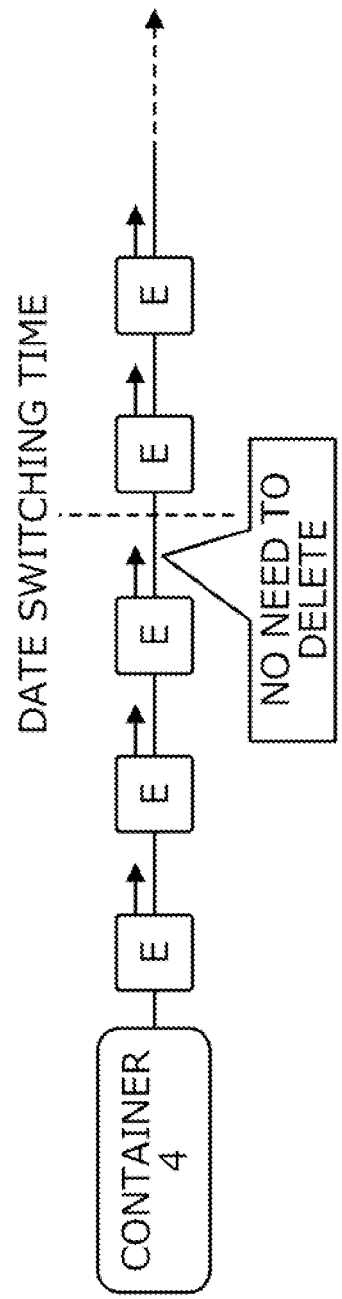
FIG. 17 is an explanatory diagram (part 4) illustrating an example of deleting the execution server container.

In FIG. 17, it is assumed that a job E is, for example, a job activated a plurality of times on an operation date. It is assumed that a container 4 exists as the execution server container. It is assumed that the container 4 repeatedly executes the job E.

The information processing device 100 determines whether or not the number of repetitions of the job E is equal to or greater than a deletion threshold. In the example of FIG. 17, the information processing device 100 determines that the number of repetitions of the job E is equal to or greater than the deletion threshold. When the number of repetitions of the job E is equal to or greater than the deletion threshold, the information processing device 100 determines that it is preferable to leave the container 4 to which the job E is deployed as a deployment destination for repeatedly deploying the job E without deletion. With this configuration, the information processing device 100 may make it easier to avoid delay in timing of starting execution of the job E by repeating creation and deletion of an execution server container to which the job E is deployed.

On the other hand, when the number of repetitions of the job E is less than the deletion threshold, the information processing device 100 may delete the container 4 to which the job E is deployed in response to completion of the job E. With this configuration, the information processing device 100 may suppress an increase in a use amount of resources.

As described above, the information processing device 100 may suppress the increase in the use amount of the resources, and may achieve reduction in a workload imposed on a user. For example, since it is determined whether or not to delete a container, the information processing device 100 may avoid continuing to activate an unnecessary container, and may suppress the increase in the use amount of the resources. The information processing device 100 may dispense with the need for the user to determine whether or not to delete the container, and may suppress the increase in the workload imposed on the user.

For example, since the it is possible deploy a plurality of jobs to one container, the information processing device 100 may make it easier to avoid delay in timing of starting execution of the jobs. For example, since it is possible to deploy a plurality of jobs to one container, the information processing device 100 may make it easier to link the jobs with each other. For example, the information processing device 100 may make it easier for the jobs to exchange files with each other.

Overall Processing Procedure

Next, an example of an overall processing procedure executed by the information processing device 100 will be described with reference to FIG. 18. Overall processing is implemented by, for example, the CPU 301, a storage area such as the memory 302 or the recording medium 305, and the network I/F 303 illustrated in FIG. 3.

Figure 18:
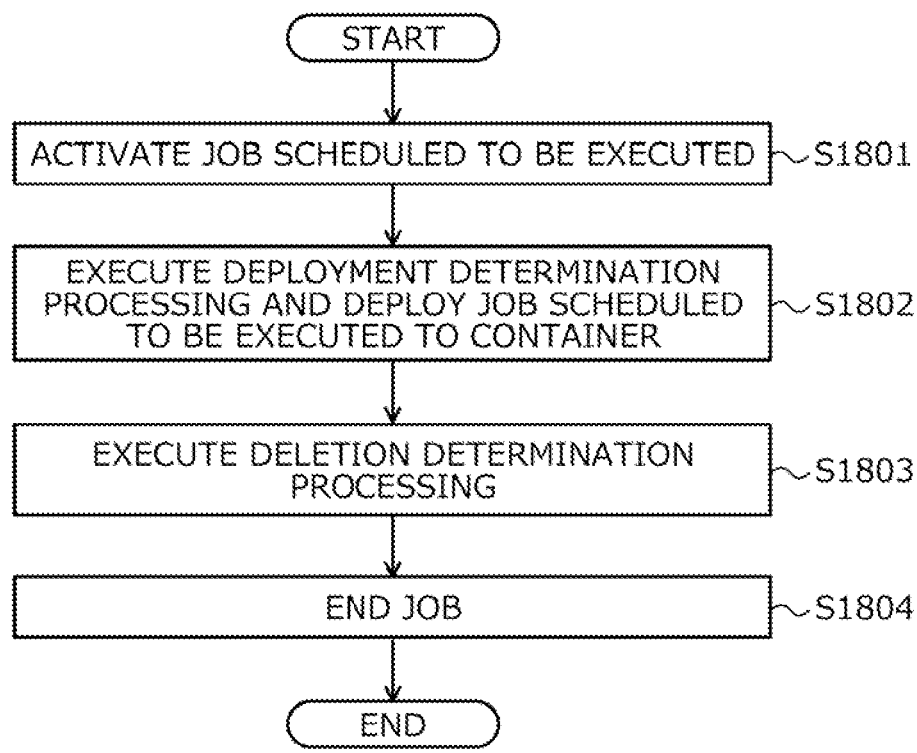
FIG. 18 is a flowchart illustrating an example of an overall processing procedure.

FIG. 18 is a flowchart illustrating an example of the overall processing procedure. In FIG. 18, the information processing device 100 activates a job scheduled to be executed (Step S1801).

Next, the information processing device 100 executes deployment determination processing described later with reference to FIG. 19, and deploys the job scheduled to be executed to a container (Step S1802). Then, after completion of the job, the information processing device 100 executes deletion determination processing described later with reference to FIG. 20 (Step S1803).

Next, the information processing device 100 ends the job (Step S1804). Then, the information processing device 100 ends the overall processing. With this configuration, the information processing device 100 may cause the container to appropriately execute the job.

Deployment Determination Processing Procedure

Next, an example of a deployment determination processing procedure executed by the information processing device 100 will be described with reference to FIG. 19. The deployment determination processing is implemented by, for example, the CPU 301, a storage area such as the memory 302 or the recording medium 305, and the network I/F 303 illustrated in FIG. 3.

Figure 19:
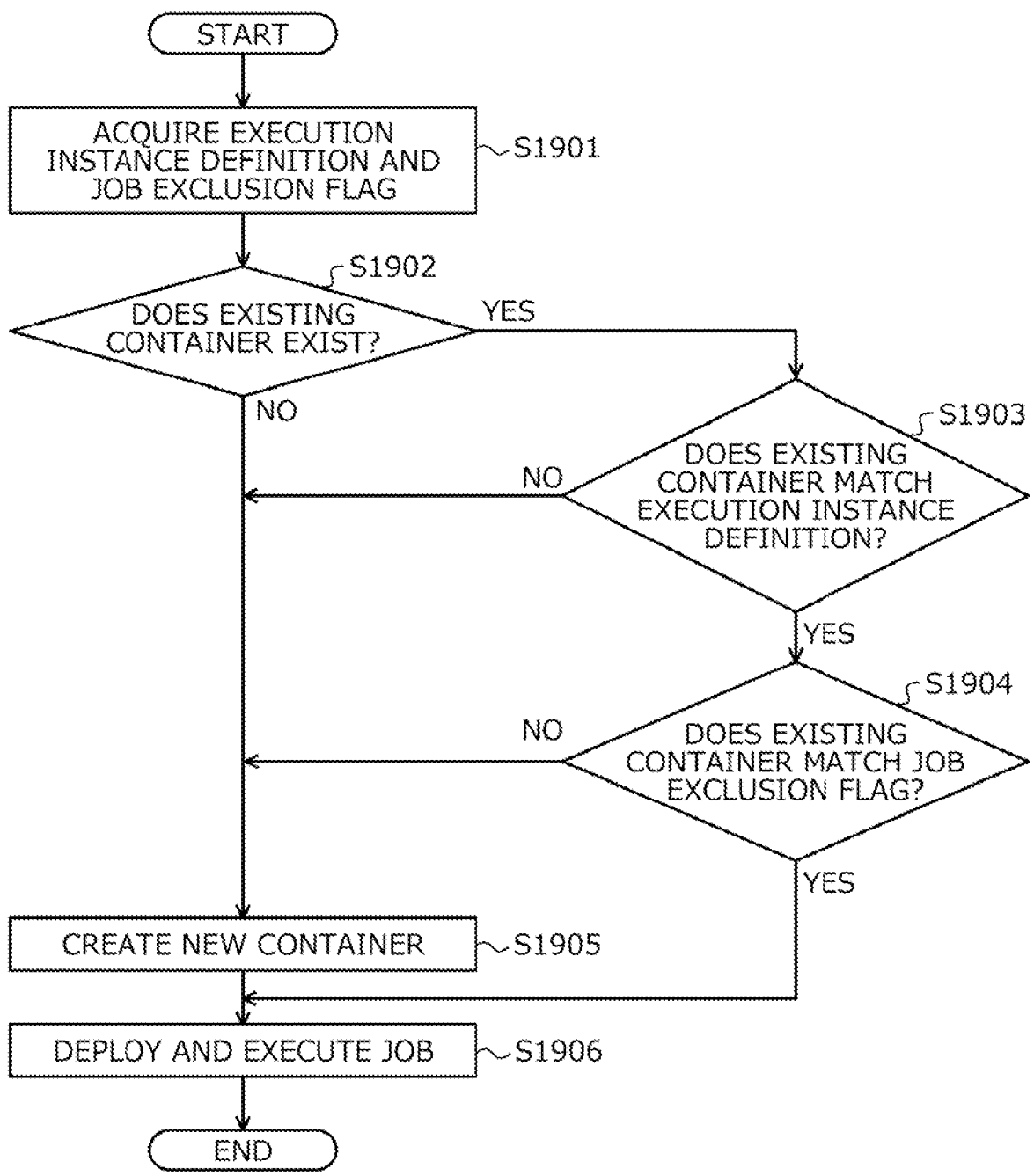
FIG. 19 is a flowchart illustrating an example of a deployment determination processing procedure.

FIG. 19 is a flowchart illustrating an example of the deployment determination processing procedure. In FIG. 19, the information processing device 100 acquires an execution instance definition and a job exclusion flag for the job scheduled to be executed, with reference to the job net management table 400 (Step S1901).

Next, the information processing device 100 determines whether or not an existing container that may implement an execution server exists, with reference to the container management table 500 (Step S1902). Here, in a case where the existing container does not exist (Step S1902: No), the information processing device 100 proceeds to processing in Step S1905. On the other hand, in a case where the existing container exists (Step S1902: Yes), the information processing device 100 proceeds to processing in Step S1903.

In Step S1903, the information processing device 100 determines whether or not the existing container matches the acquired execution instance definition, with reference to the container management table 500 (Step S1903). Here, in the case of not matching the execution instance definition (Step S1903: No), the information processing device 100 proceeds to the processing in Step S1905. On the other hand, in the case of matching the execution instance definition (Step S1903: Yes), the information processing device 100 proceeds to processing in Step S1904.

In Step S1904, the information processing device 100 determines whether or not the existing container matches the acquired job exclusion flag, with reference to the container management table 500 (Step S1904). Here, in the case of not matching the job exclusion flag (Step S1904: No), the information processing device 100 proceeds to the processing in Step S1905. On the other hand, in the case of matching the job exclusion flag (Step S1904: Yes), the information processing device 100 proceeds to processing in Step S1906.

In Step S1905, the information processing device 100 creates a new container that may implement an execution server of the job scheduled to be executed (Step S1905). Then, the information processing device 100 proceeds to the processing in Step S1906.

In Step S1906, the information processing device 100 deploys the job scheduled to be executed to the existing container or the new container, and causes the existing container or the new container to execute the job scheduled to be executed (Step S1906). Then, the information processing device 100 ends the deployment determination processing. With this configuration, the information processing device 100 may make it possible to execute a job while suppressing an increase in a use amount of resources.

Deletion Determination Processing Procedure

Next, an example of a deletion determination processing procedure executed by the information processing device 100 will be described with reference to FIG. 20. The deletion determination processing is implemented by, for example, the CPU 301, a storage area such as the memory 302 or the recording medium 305, and the network I/F 303 illustrated in FIG. 3.

Figure 20:
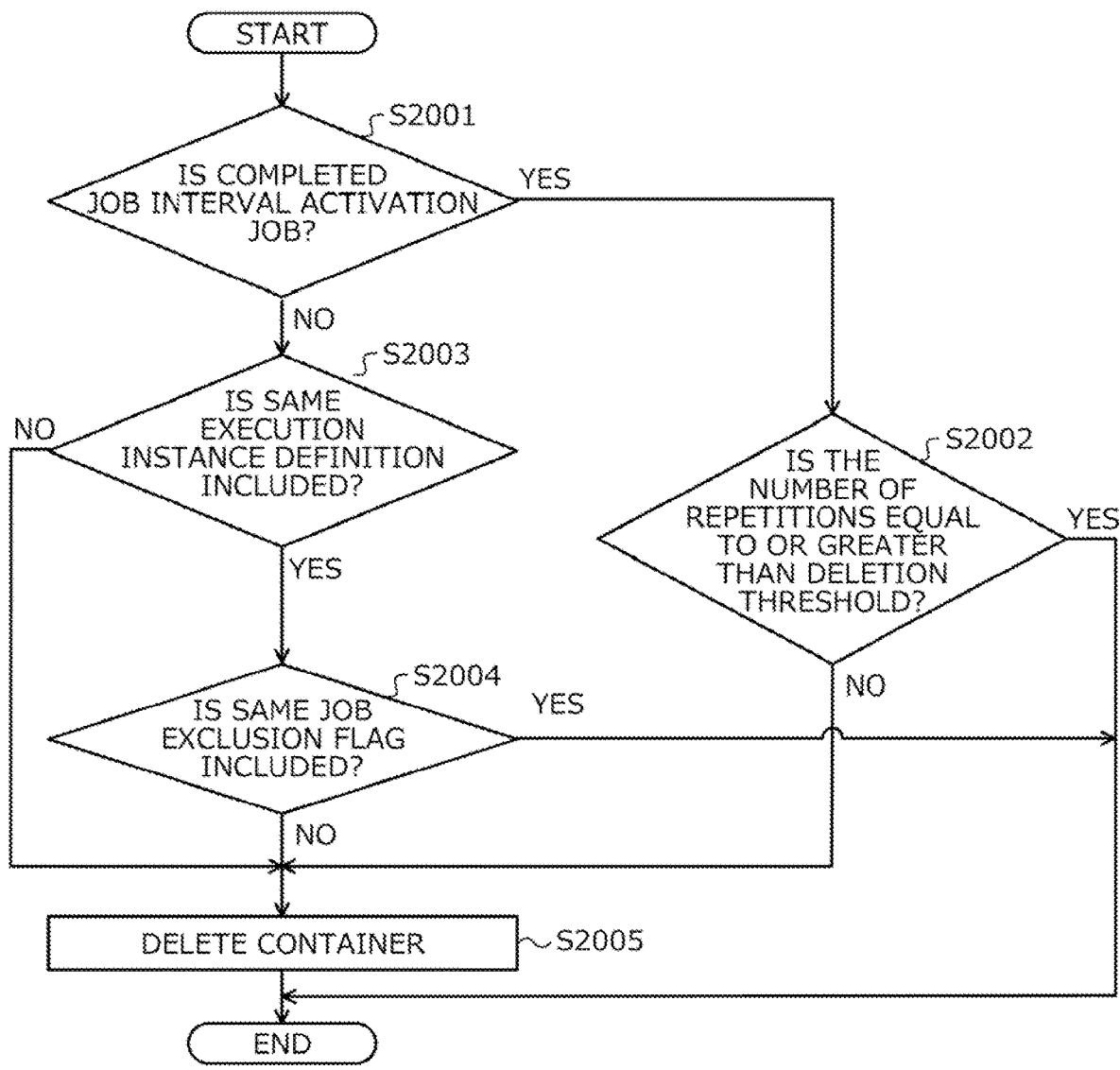
FIG. 20 is a flowchart illustrating an example of a deletion determination processing procedure.

FIG. 20 is a flowchart illustrating an example of the deletion determination processing procedure. In FIG. 20, the information processing device 100 determines whether or not the completed job is an interval activation job, with reference to the job net management table 400 (Step S2001). Here, in the case of the interval activation job (Step S2001: Yes), the information processing device 100 proceeds to processing in Step S2002. On the other hand, in the case of not the interval activation job (Step S2001: No), the information processing device 100 proceeds to processing in Step S2003.

In Step S2002, the information processing device 100 determines whether or not the number of repetitions of the completed job is equal to or greater than a deletion threshold (Step S2002). Here, in the case of less than the deletion threshold (Step S2002: No), the information processing device 100 proceeds to processing in Step S2005. On the other hand, in the case of equal to or greater than the deletion threshold (Step S2002: Yes), the information processing device 100 ends the deletion determination processing.

In Step S2003, the information processing device 100 determines whether or not another job scheduled to be executed includes the same execution instance definition as the container to which the completed job is deployed, with reference to the job net management table 400 (Step S2003). Here, in the case of not including the same execution instance definition (Step S2003: No), the information processing device 100 proceeds to the processing in Step S2005. On the other hand, in the case of including the same execution instance definition (Step S2003: Yes), the information processing device 100 proceeds to processing in Step S2004.

In Step S2004, the information processing device 100 determines whether or not the another job scheduled to be executed includes the same job exclusion flag as the container to which the completed job is deployed, with reference to the job net management table 400 (Step S2004). Here, in the case of not including the same job exclusion flag (Step S2004: No), the information processing device 100 proceeds to the processing in Step S2005. On the other hand, in the case of including the same job exclusion flag (Step S2004: Yes), the information processing device 100 ends the deletion determination processing.

In Step S2005, the information processing device 100 deletes the container to which the completed job is deployed (Step S2005). Then, the information processing device 100 ends the deletion determination processing. With this configuration, the information processing device 100 may delete a container determined to be unnecessary. The information processing device 100 may make it possible to execute a job while suppressing an increase in a use amount of resources.

Here, the information processing device 100 may switch some steps in each of the flowcharts in FIGS. 18 to 20 in the processing order and execute the processing. For example, Steps S2003 and S2004 may be switched in the processing order. Furthermore, the information processing device 100 may omit processing in some steps in each of the flowcharts in FIGS. 18 to 20. For example, the processing in Steps S2001 and S2002 may be omitted.

As described above, according to the information processing device 100, it is possible to acquire a first condition of an execution environment to which a first job is deployed with reference to first information that makes it possible to specify, for each job, a condition of an execution environment to which the job is deployed. According to the information processing device 100, it is possible to create a first execution environment to which the first job is deployed based on the acquired first condition. According to the information processing device 100, it is possible to deploy the first job to the created first execution environment, and execute the first job. According to the information processing device 100, in response to completion of the first job, it is possible to delete the created first execution environment to which the first job is deployed in a case where a deletion condition corresponding to the first job is satisfied. With this configuration, the information processing device 100 may suppress an increase in a use amount of resources, and may suppress an increase in a workload imposed on a user.

According to the information processing device 100, a container may be adopted as the execution environment. With this configuration, the information processing device 100 may adopt an execution environment that is easy to create, and may make it easier to make timing of starting execution of a job earlier.

According to the information processing device 100, with reference to the first information, it is possible to acquire a second condition of an execution environment to which a second job is deployed. According to the information processing device 100, with reference to second information that makes it possible to specify a relationship between a plurality of linked jobs, it is possible to determine whether or not the second job is scheduled to be executed after the first job and is linked with the first job. According to the information processing device 100, in the case of linking, when the acquired first condition and the acquired second condition match, it is possible to deploy the second job to the first execution environment to which the first job is deployed, and execute the second job. With this configuration, the information processing device 100 may make it possible to deploy a plurality of jobs to one execution environment, and may suppress the increase in the use amount of the resources.

According to the information processing device 100, in a case where the first job has been completed by predetermined timing, it is possible to delete the first execution environment to which the first job is deployed by the predetermined timing. With this configuration, the information processing device 100 may appropriately delete an execution environment, and may suppress the increase in the use amount of the resources.

According to the information processing device 100, in a case where the first job has not been completed by the predetermined timing, it is possible not to delete the first execution environment to which the first job is deployed until the first job is completed, and delete the first execution environment to which the first job is deployed after the first job is completed. With this configuration, the information processing device 100 may avoid deletion of an execution environment that is executing a job. The information processing device 100 may appropriately delete an execution environment so as not to fail execution of a job, and may suppress the increase in the use amount of the resources.

According to the information processing device 100, in a case where another job to be newly deployed to the first execution environment to which the first job is deployed does not exist by predetermined timing after the first job has been completed, it is possible to delete the first execution environment to which the first job is deployed by the predetermined timing. With this configuration, the information processing device 100 may determine whether or not an execution environment becomes unnecessary, appropriately delete the execution environment, and may suppress the increase in the use amount of the resources.

According to the information processing device 100, when another job is executed in the first execution environment to which the first job is deployed, it is possible to dispense with the need to delete the first execution environment to which the first job is deployed. According to the information processing device 100, when another job is not executed in the first execution environment to which the first job is deployed, it is possible to delete the first execution environment to which the first job is deployed in response to completion of the first job. With this configuration, the information processing device 100 may avoid deletion of an execution environment that is executing a job. The information processing device 100 may appropriately delete an execution environment so as not to fail execution of a job, and may suppress the increase in the use amount of the resources.

According to the information processing device 100, in a case where the number of times the first job is repeatedly executed is less than the predetermined number of times in a predetermined period, it is possible to delete the first execution environment to which the first job is deployed in response to completion of the first job. With this configuration, in a case where an execution environment in which a job has not been executed remains for a relatively long time unless the execution environment is deleted, the information processing device 100 may delete the execution environment, and may suppress the increase in the use amount of the resources.

According to the information processing device 100, in a case where the number of times the first job is repeatedly executed is equal to or greater than the predetermined number of times in the predetermined period, it is possible to delete the first execution environment to which the first job is deployed in response to completion of the first job last executed in the predetermined period. With this configuration, the information processing device 100 may suppress an increase in a use amount of resources. The information processing device 100 may make it easier to avoid delay in timing of starting execution of a job by repeating creation and deletion of an execution environment.

According to the information processing device 100, it is possible to acquire a third condition of an execution environment to which a third job which is scheduled to be executed after the first job and is linked with the first job is deployed, with reference to the first information and the second information that makes it possible to specify the relationship between the plurality of linked jobs. According to the information processing device 100, in a case where the first condition and the acquired third condition do not match, it is possible to delete the first execution environment to which the first job is deployed in response to completion of the first job. With this configuration, when there is no job to be executed thereafter in an execution environment, the information processing device 100 may delete the execution environment, and may suppress the increase in the use amount of the resources.

According to the information processing device 100, with reference to the second information, in a case where the second job is not linked with the first job, it is possible to create a second execution environment to which the second job is deployed. According to the information processing device 100, it is possible to deploy the second job to the created second execution environment, and execute the second job. With this configuration, the information processing device 100 may make it possible to execute a job.

According to the information processing device 100, it is possible to back up overall information of the created first execution environment. According to the information processing device 100, when the created first execution environment is abnormal, it is possible to restore the created first execution environment based on the backed-up overall information of the first execution environment. With this configuration, the information processing device 100 may take measures against down of a computer that implements the first execution environment.

Note that the information processing method described in the present embodiment may be implemented by executing a program prepared in advance on a computer such as a PC or a workstation. The information processing program described in the present embodiment is executed by being recorded on a computer-readable recording medium and being read from the recording medium by the computer. The recording medium is a hard disk, a flexible disk, a compact disc (CD)-ROM, a magneto optical disc (MO), a digital versatile disc (DVD), or the like. Furthermore, the information processing program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute processing comprising:
   acquiring a first condition of an execution environment to which a first job is deployed with reference to first information that makes it possible to specify, for each job, a condition of an execution environment to which the job is deployed;
   creating a first execution environment to which the first job is deployed based on the acquired first condition;
   deploying the first job to the created first execution environment;
   executing the first job; and
   deleting, in response to completion of the first job, the created first execution environment to which the first job is deployed in a case where a deletion condition that corresponds to the first job is satisfied, in a case where the first job has been completed by predetermined timing, the first execution environment to which the first job is deployed is deleted by the predetermined timing,
   the first job has a property of being repeatedly executed, and
   in the deleting,
   in a case where the number of times the first job is repeatedly executed is less than a predetermined number of times in a predetermined period, the first execution environment to which the first job is deployed is deleted in response to completion of the first job.

2. The non-transitory computer-readable recording medium according to claim 1, wherein the execution environment is a container.

3. The non-transitory computer-readable recording medium according to claim 1, wherein,
   in the processing of acquiring,
   a second condition of an execution environment to which a second job different from the first job is deployed is acquired with reference to the first information, and
   in the processing of executing,
   with reference to second information that makes it possible to specify a relationship between a plurality of linked jobs, when the acquired first condition and the acquired second condition match in a case where the second job is scheduled to be executed after the first job and is linked with the first job, the second job is deployed to the first execution environment to which the first job is deployed, and the second job is executed.

4. The non-transitory computer-readable recording medium according to according to claim 3, wherein,
in the processing of creating,
with reference to the second information, in a case where the second job is not linked with the first job, a second execution environment to which the second job is deployed is created, and
in the processing of executing,
the second job is deployed to the created second execution environment, and the second job is executed.

5. The non-transitory computer-readable recording medium according to according to claim 1, wherein, in the processing of deleting,
in a case where another job to be newly deployed to the first execution environment to which the first job is deployed does not exist by predetermined timing after the first job has been completed, the first execution environment to which the first job is deployed is deleted by the predetermined timing.

6. The non-transitory computer-readable recording medium according to claim 1, wherein, in the processing of deleting,
when another job is executed in the first execution environment to which the first job is deployed, the first execution environment to which the first job is deployed is not deleted, and when another job is not executed in the first execution environment to which the first job is deployed, the first execution environment to which the first job is deployed is deleted in response to completion of the first job.

7. The non-transitory computer-readable recording medium according to claim 1, wherein
the first job has a property of being repeatedly executed, and
in the processing of deleting,
in a case where the number of times the first job is repeatedly executed is equal to or greater than a predetermined number of times in a predetermined period, the first execution environment to which the first job is deployed is deleted in response to completion of the first job last executed in the predetermined period.

8. The non-transitory computer-readable recording medium according to according to claim 1, wherein
a third condition of an execution environment to which a third job that is different from the first job, is scheduled to be executed after the first job, and is linked with the first job is deployed is acquired, with reference to the first information and second information that makes it possible to specify a relationship between a plurality of linked jobs, and
in the processing of deleting,
in a case where the first condition and the acquired third condition do not match, the first execution environment to which the first job is deployed is deleted in response to completion of the first job.

9. The non-transitory computer-readable recording medium according to according to claim 1, for causing the computer to execute processing comprising:
backing up overall information of the created first execution environment, and
restoring, when the created first execution environment is abnormal, the created first execution environment based on the backed-up overall information of the first execution environment.

10. The non-transitory computer-readable recording medium according to claim 1, wherein in the deleting,
in a case where the number of times the first job is repeatedly executed is not less than the predetermined number of times in the predetermined period, the first execution environment to which the first job is deployed is not deleted until completion of the first job last executed in the predetermined period.

11. An information processing method comprising:
acquiring a first condition of an execution environment to which a first job is deployed with reference to first information that makes it possible to specify, for each job, a condition of an execution environment to which the job is deployed;
creating a first execution environment to which the first job is deployed based on the acquired first condition;
deploying the first job to the created first execution environment;
executing the first job; and
deleting, in response to completion of the first job, the created first execution environment to which the first job is deployed in a case where a deletion condition that corresponds to the first job is satisfied, in a case where the first job has been completed by predetermined timing, the first execution environment to which the first job is deployed is deleted by the predetermined timing,
the first job has a property of being repeatedly executed, and
in the deleting,
in a case where the number of times the first job is repeatedly executed is less than a predetermined number of times in a predetermined period, the first execution environment to which the first job is deployed is deleted in response to completion of the first job.

12. The information processing method according to claim 11, wherein in the deleting,
in a case where the number of times the first job is repeatedly executed is not less than the predetermined number of times in the predetermined period, the first execution environment to which the first job is deployed is not deleted until completion of the first job last executed in the predetermined period.

13. An information processing system comprising:
a memory; and
a processor coupled to the memory and configured to:
acquire a first condition of an execution environment to which a first job is deployed with reference to first information that makes it possible to specify, for each job, a condition of an execution environment to which the job is deployed;
create a first execution environment to which the first job is deployed based on the acquired first condition;
deploy the first job to the created first execution environment;
execute the first job; and
delete, in response to completion of the first job, the created first execution environment to which the first job is deployed in a case where a deletion condition that corresponds to the first job is satisfied, in a case where the first job has been completed by predetermined timing, the first execution environment to which the first job is deployed is deleted by the predetermined timing,
the first job has a property of being repeatedly executed, and in the delete,
in a case where the number of times the first job is repeatedly executed is less than a predetermined number of times in a predetermined period, the first execution environment to which the first job is deployed is deleted in response to completion of the first job.

14. The information processing system according to claim 13, wherein in the delete,
in a case where the number of times the first job is repeatedly executed is not less than the predetermined number of times in the predetermined period, the first execution environment to which the first job is deployed is not deleted until completion of the first job last executed in the predetermined period.

* * * * *